United States Patent
Kaita et al.

(10) Patent No.: US 8,220,862 B2
(45) Date of Patent: Jul. 17, 2012

(54) DOOR DEVICE OF SMALL-SIZED VEHICLE

(75) Inventors: Kihoko Kaita, Wako (JP); Masahiro Inoue, Wako (JP); Yukinori Kawaguchi, Wako (JP); Yoshiyuki Sato, Wako (JP); Kazunori Kuroda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/934,270

(22) PCT Filed: Feb. 17, 2009

(86) PCT No.: PCT/JP2009/000629
§ 371 (c)(1),
(2), (4) Date: Nov. 30, 2010

(87) PCT Pub. No.: WO2009/122645
PCT Pub. Date: Oct. 8, 2009

(65) Prior Publication Data
US 2011/0062748 A1     Mar. 17, 2011

(30) Foreign Application Priority Data

Mar. 31, 2008  (JP) ................................. 2008-092213

(51) Int. Cl.
*B60J 5/00* (2006.01)
(52) U.S. Cl. .................................................. 296/146.5
(58) Field of Classification Search ............... 296/146.5, 296/163, 164.1, 75, 209, 146.11, 146.12, 296/37.13; 280/163, 164.1
See application file for complete search history.

(56) References Cited

U.S. PATENT DOCUMENTS

| 2,005,198 | A | * | 6/1935 | Morrison | 296/37.13 |
| 2,056,202 | A | * | 10/1936 | Morrison | 296/153 |
| 2006/0061133 | A1 | * | 3/2006 | Sawajiri | 296/146.1 |

FOREIGN PATENT DOCUMENTS

| JP | 57-78356 U | 5/1982 |
| JP | 1-123553 U | 8/1989 |
| JP | 7-18947 U | 4/1995 |
| JP | 8-108866 | 4/1996 |
| JP | 2007-30706 | 2/2007 |
| JP | 2007-269147 | 10/2007 |

OTHER PUBLICATIONS

International Search Report for International Application No. PCT/JP2009/000629, May 26, 2009.
Written Opinion of the International Searching Authority for International Application No. PCT/JP2009/000629, May 26, 2009.
International Preliminary Report on Patentability (Chapter I) with Translation of Written Opinion of the International Searching Authority (w/ International Preliminary Report) for corresponding International Application No. PCT/JP2009/000629, Dec. 23, 2010.

* cited by examiner

*Primary Examiner* — Dennis Pedder
(74) *Attorney, Agent, or Firm* — Ditthavong Mori & Steiner, P.C.

(57) ABSTRACT

Provide a door device of a small-sized vehicle that can secure space for occupants. An openable door 70 is provided to a side of a vehicle body to cover an opening and a convex portion 75 that gets on a footboard 62 when the door 70 is closed is provided to an inside lower part of the door 70.

8 Claims, 19 Drawing Sheets

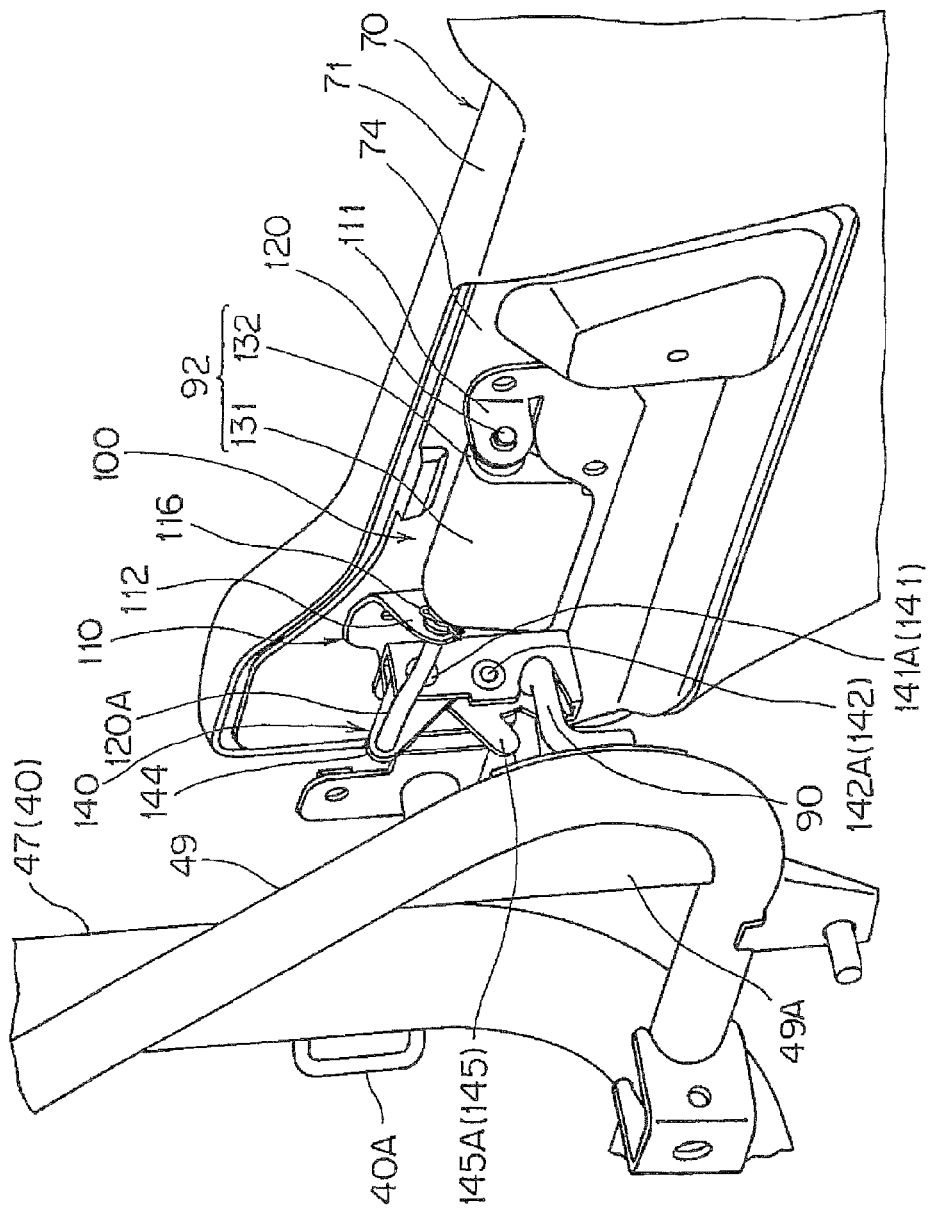

DOOR DEVICE OF SMALL-SIZED VEHICLE

TECHNICAL FIELD

The present invention relates to a door device of a small-sized vehicle.

BACKGROUND ART

A small-sized vehicle includes a multi utility vehicle (MUV) that can run on wasteland and the like. In this type of some vehicles, a seated type of seat is provided, a leg space in front of the seat is extended in a lateral direction, a side of a body is open, and a lower end of the opening on the side of the body functions as a footboard (for example, refer to a patent document 1). Patent document 1: JP-A No. 2007-269147

DISCLOSURE OF THE INVENTION

Problem to be Solved by the Invention

When an openable door is provided to cover the opening on the side of the body of the above-mentioned small-sized vehicle, it is desired that the door has a shape in which space for occupants can be sufficiently secured.

The present invention is made in view of the above-mentioned situation and it is an object of the present invention to provide a door device of a small-sized vehicle in which space for occupants can be secured.

Means of Solving the Problem

To achieve the above-mentioned object, according to the present invention, there is provided a door device of a small-sized vehicle provided with a body having an opening on at least one side and a footboard at a lower end of the opening, characterized in that an openable door is provided to a side of the body to cover the opening and a convex portion that gets on the footboard when the door is closed is provided to an inside lower part of the door.

According to the present invention, as the openable door is provided to the side of the body to cover the opening on the side of the body and the convex portion that gets on the footboard when the door is closed is provided to the inside lower part of the door, an internal surface where the inside of the door and a floor are integrated is formed and space for occupants can be secured.

A concave portion for letting in an occupant's leg may be also provided over the convex portion inside the door. According to this configuration, as the concave portion for letting in the occupant's leg is provided over the convex portion inside the door, space for the occupant can be extended without changing a shape of a wall of the door and when the leg is moved, the concave portion functions as a guide for the leg and can prevent the leg from moving on the side of the lever.

A concave portion for embedding a door hinge of the door may be also provided to a front end of the door. According to this configuration, as the concave portion for embedding the door hinge is provided to the front end of the door, space for occupants can be greatly secured by the quantity of the concave portion.

The footboard is provided to an end of the floor of the small-sized vehicle in a lower position than the floor and height of a top face of the convex portion may be also set to the same level as the floor. According to this configuration, as the height of the top face of the convex portion inside the door is set to the same level as the floor, the floor can be extended by the quantity of the convex portion. The door is hollowly molded in resin and the convex portion may be also integrated when the door is hollowly molded in resin. According to this configuration, the convex portion can be easily provided.

A latch mechanism locked by a latch striker provided on the side of the vehicle body may be also provided to the door. The latch mechanism is provided with a lever member operated according to the operation of the opening/closing lever and a latch member that can release fitting to the latch striker in interlock with the operation of the lever member. According to this configuration, the latch mechanism is operated according to the operation of the opening/closing lever and can release fitting to the latch striker. In this case, the latch member may be also coupled to the lever member via a lost motion mechanism that operates the latch member with play for the operation of the lever member. According to this configuration, while the opening/closing lever is operated in a relatively small operational range, fitting to the latch striker can be held.

Effect of the Invention

According to the present invention, as the openable door is provided to the side of the body to cover the opening on the side of the body and the convex portion that gets on the footboard when the door is closed is provided to the inside lower part of the door, the internal surface where the inside of the door and the floor are integrated is formed and the space for occupants can be secured.

As the concave portion for letting in an occupant's leg is provided over the convex portion inside the door, the space for occupants can be extended without changing the shape of the wall of the door, in addition, when the foot is moved, the concave portion functions as the guide for the foot, and the concave portion can prevent the foot from moving on the side of the lever.

As the concave portion for embedding the door hinge of the door is provided to the front end of the door, the space for occupants can be greatly secured by the quantity of the concave portion. As the footboard is provided to the end of the floor of the small-sized vehicle in the lower position than the floor and the height of the top face of the convex portion is set to the same level as the floor, the floor can be extended by the quantity of the convex portion. Besides, as the door is hollowly molded in resin and the convex portion is integrated when the door is hollowly molded in resin, the convex portion can be easily provided.

As the latch mechanism locked by the latch striker provided on the side of the vehicle body is provided to the door and is provided with the lever member operated according to the operation of the opening/closing lever and the latch member that can release fitting to the latch striker in interlock with the operation of the lever member, the latch mechanism is operated according to the operation of the opening/closing lever and can release fitting to the latch striker. Besides, as the latch member is coupled to the lever member via the lost motion mechanism that operates the latch member with play for the operation of the lever member, the fitting to the latch striker can be held while the opening/closing lever is operated in the relatively small operational range.

BRIEF DESCRIPTION OF THE DRAWINGS

FIG. 19 shows a mechanism section of the lock unit together with its peripheral configuration.

DESCRIPTION OF REFERENCE NUMERALS

Figure 1:
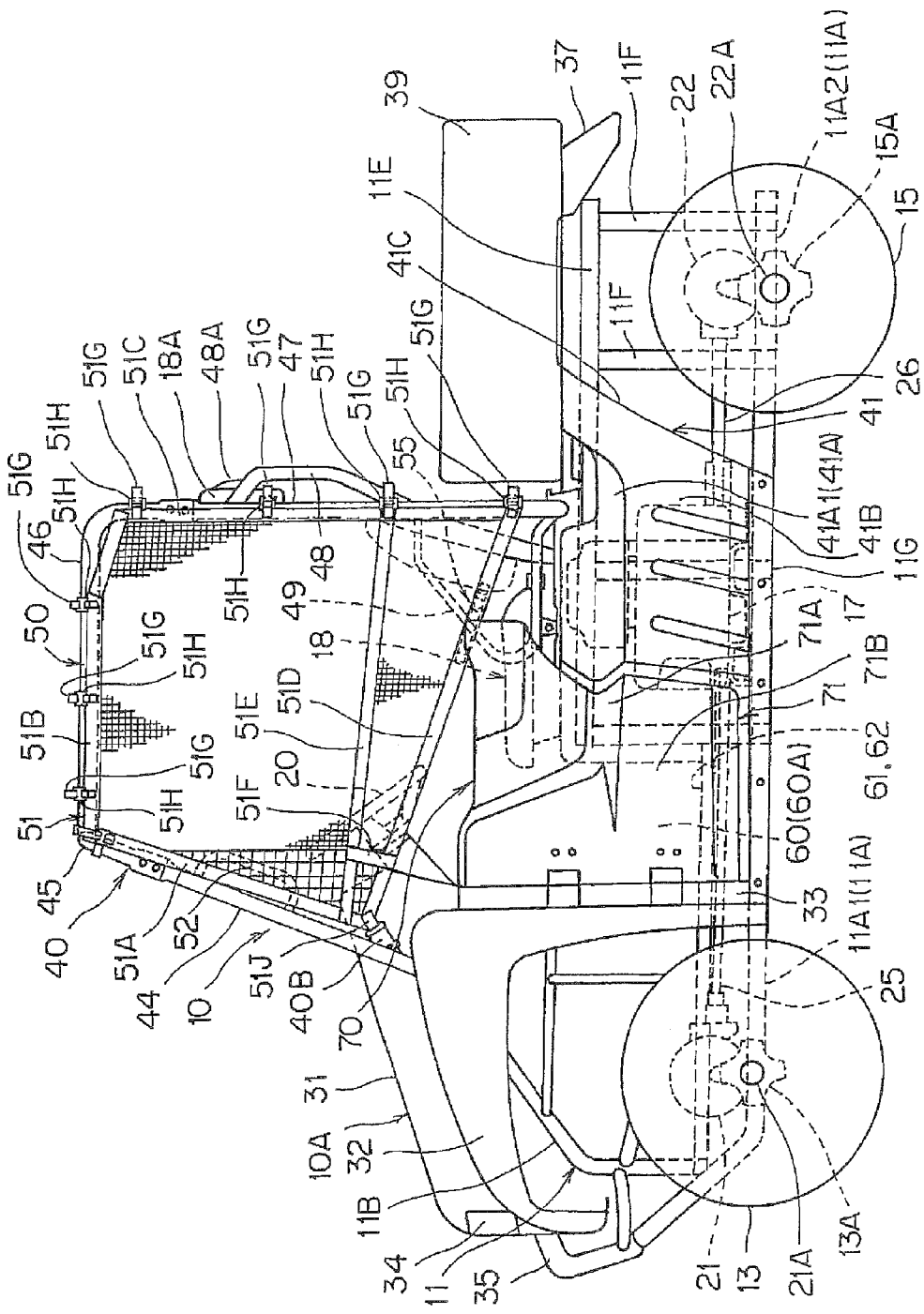
FIG. 1 is a side view showing a small-sized vehicle in a first embodiment of the invention.

10 Small-sized vehicle
10A Body
11 Body frame
11X Door supporting frame
13 Front wheel
15 Rear wheel
17 Power unit
18 Occupant seat
33 Cover member
40 Roll bar
41 Side cover
49 Hip guard
50 Net
60 Space to put feet
60A Opening
61 Floor panel
62 footboard
70 Door
71 Body of door
72 Front concave portion
73 Central concave portion
74 Upper concave portion
75 Convex portion
80 Door hinge
90 Latch striker
91 Lock unit
92 Opening/Closing lever
100 Mechanism section
101 Unit cover
110 Base plate
120 Supporting shaft
140 Latch mechanism (Latch lock mechanism)

BEST MODES FOR CARRYING OUT THE INVENTION

Referring to the attached drawings, one embodiment of the present invention will be described below. In the following description, a direction such as forward, backward, rightward, leftward, upward and downward shall be a direction viewed from an occupant (a passenger) seated on a vehicle body.

FIG. 1 is a side view showing a small-sized vehicle in a first embodiment of the present invention. The small-sized vehicle 10 is a vehicle classified into a multi utility vehicle (MUV) suitable for running on an uneven road, provided with right and left front wheels 13, 13 and right and left rear wheels 15, 15 respectively independently suspended, for example, supported by a double wishbone type suspension from a vehicle body frame 11, a power unit 17 including an engine and a transmission and supported by the vehicle body frame 11 between the front wheels 13, 13 and the rear wheels 15, 15, such as a substantially intermediate position in a longitudinal direction of a vehicle body, two occupant seats 18, 18 to be a driver's seat and a passenger seat respectively supported by the vehicle body frame 11 over the power unit 17 and a steering wheel 20 for steering the front wheels 13, 13.

A final reduction gear 21 for the front wheels is supported between the right and left front wheels 13, 13 by the vehicle body frame 11 and is coupled to the right and left front wheels 13, 13 via a driving shaft 21A coupled to the right side and the left side of the final reduction gear 21. Besides, a final reduction gear 22 for the rear wheels is supported between the right and left rear wheels 15, 15 by the vehicle body frame 11 and is coupled to the right and left rear wheels 15, 15 via a driving shaft 22A coupled to the right side and the left side of the final reduction gear 22. A reference numeral 13A in FIG. 1 denotes a hub on the side of the front wheel 13 to which the driving shaft 21A is coupled and 15A denotes a hub on the side of the rear wheel 15 to which the driving shaft 22A is coupled. This vehicle 10 is provided with a braking device (not shown) for braking the front wheels 13, 13 and the rear wheels 15, 15.

A front propeller shaft 25 and a rear propeller shaft 26 are coupled to the power unit 17, the rotation of the engine is decelerated at gear ratio corresponding to a predetermined shift level in the transmission, and is transmitted to both propeller shafts 25, 26.

The front propeller shaft 25 is extended forward from a lower part of the power unit 17, and is coupled to the final reduction gear 21, and transmits the driving force of the power unit 17 to the front wheels 13, 13 via the final reduction gear 21. The rear propeller shaft 26 is extended backward from the lower part of the power unit 17, and is coupled to the final reduction gear 22, and transmits the driving force of the power unit 17 to the rear wheels 15, 15 via the final reduction gear 22.

Next, the body 10A of the small-sized vehicle 10 will be described. The front of the body 10A of the small-sized vehicle 10 includes an engine hood 31 covering the front of the vehicle body from the upside, a pair of right and left front fenders 32, 32 covering each upside and each rear of the front wheels 13, 14 on the right and left sides of the engine hood 31, a headlight 34 for lighting a forward direction of the vehicle body and a carrying pipe 35 arranged in the front of the vehicle body. Besides, the rear of the body 10A of the small-sized vehicle 10 includes a pair of right and left rear fenders 37, 37 covering each upside of the rear wheels 15, 15 and a cargo bed 39 the upside for loading luggage of which is openable and which is in the shape of a box.

A roll bar 40 is provided to the body 10A of the small-sized vehicle 10 so as to substantially enclose space, which hereinafter called a passenger compartment, for an occupant or a passenger seated on the occupant seats 18, 18. A pair of right and left nets 50 are detachably provided to the right and left sides of the roll bar 40.

Further, a pair of right and left side covers 41, 41 are provided to the sides of the body 10A of the small-sized vehicle 10 to cover the right and left sides of the power unit 17, and openings 60A communicating with a leg room (leg space) 60 for an occupant is open between the side covers 41, 41 and the front fenders 32, 32. In this configuration, door 70 opened and closed to cover the right and left openings 60A are provided.

Next, the vehicle body frame 11 and its peripheral structure will be described.

Figure 2:
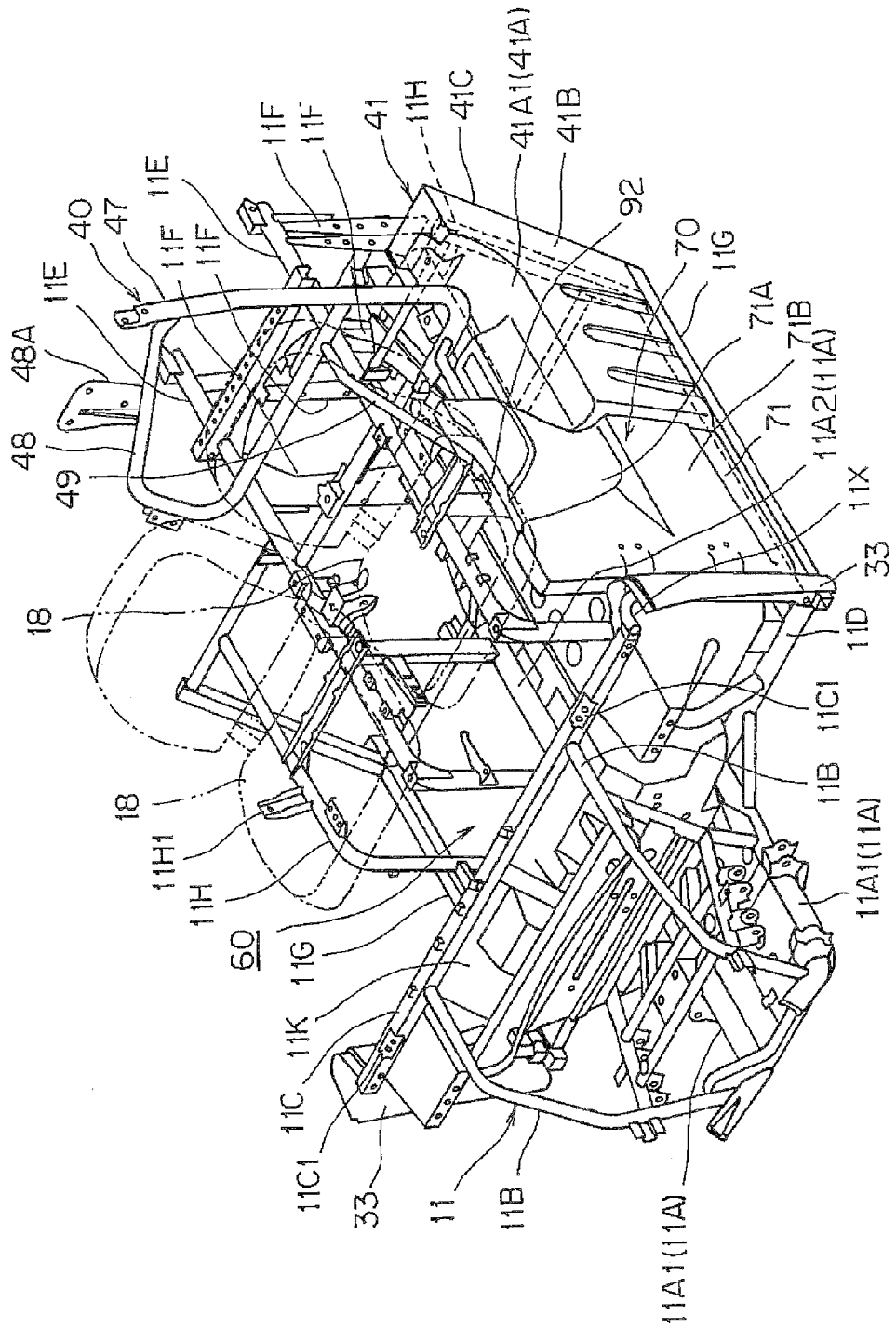
FIG. 2 is a perspective view showing a vehicle body frame together with a door and a side cover.
Figure 3:
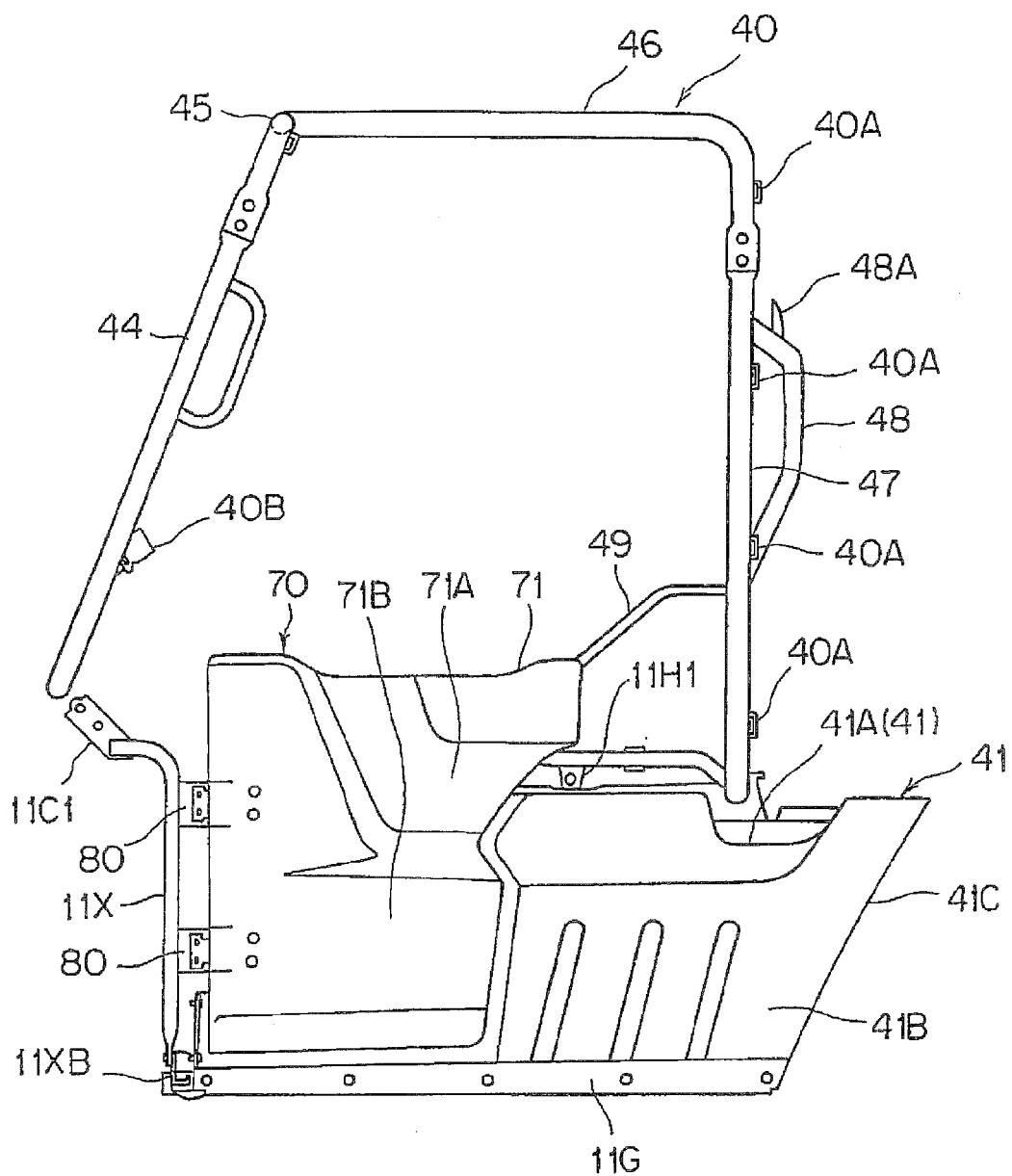
FIG. 3 is a side view showing a roll bar together with the door and the side cover.
Figure 4:
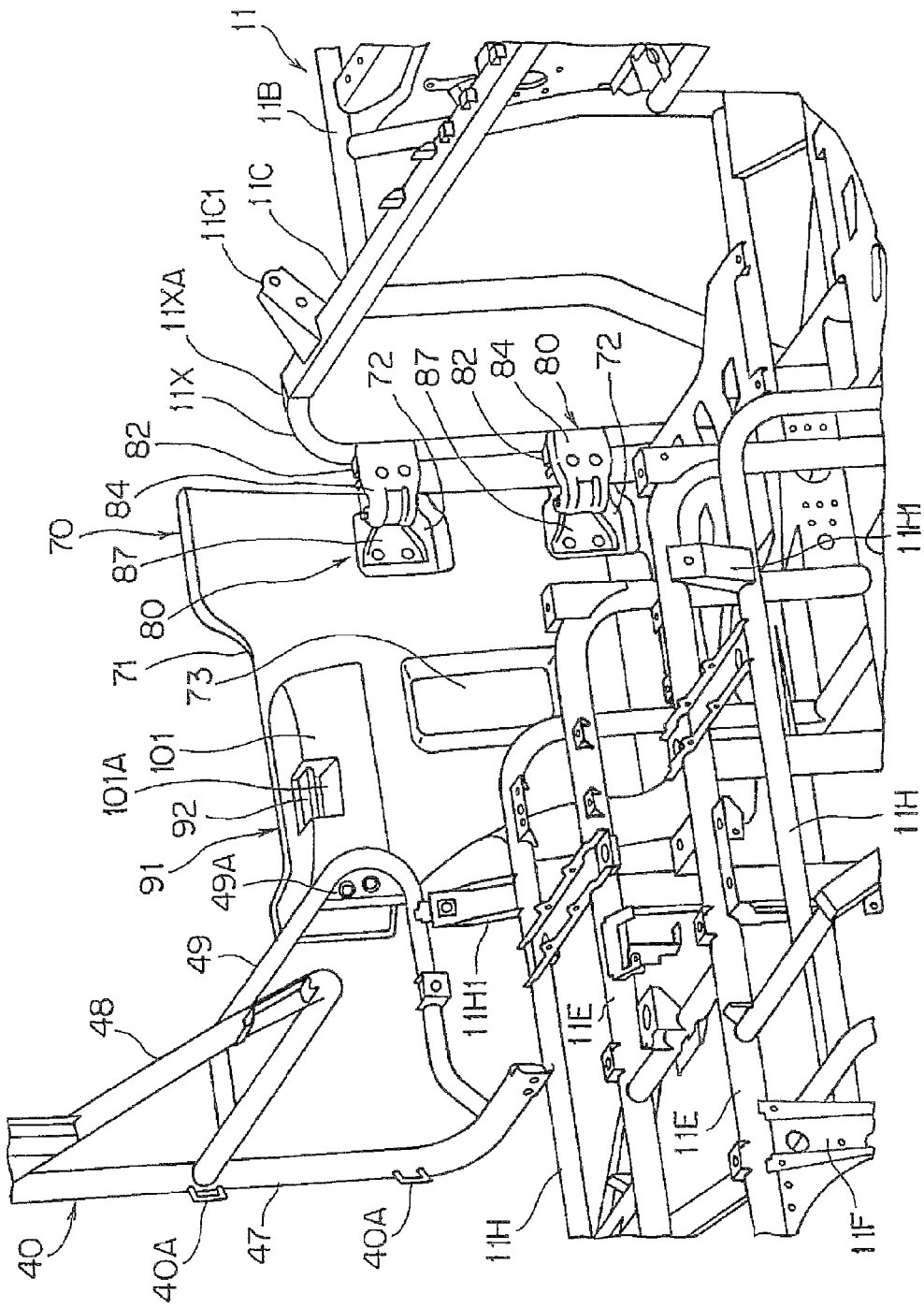
FIG. 4 shows the vehicle body frame viewed from the inside of the door.

FIG. 2 is a perspective view showing the vehicle body frame 11 together with the door 70 and the side cover 41, FIG. 3 is a side view showing the roll bar 40 together with the door 70 and the side cover 41, and FIG. 4 shows the vehicle body frame 11 viewed from the inside of the door 70.

As shown in FIG. 2, the vehicle body frame 11 includes a pair of right and left lower frames 11A, 11A extended substantially in parallel in a longitudinal direction of a bottom of the vehicle, a pair of right and left front frames 11B, 11B extended in a backward and upward direction of the vehicle body from the fronts of the lower frames 11A, 11A and extended in a backward direction of the vehicle body on the upsides of the lower frames 11A, 11A and a pair of upper and lower front cross frames 11C, 11D vertically having an interval to respectively couple the rears of the pair of front frames 11B, 11B and the pair of right and left lower frames 11A, 11A and extended laterally.

In this configuration, frame structure in which the two lower frames 11A, 11A extended in the longitudinal direction of the vehicle body are divided into two in the longitudinal direction, rear ends of lower frames 11A1, 11A1 on the front side are coupled to the front cross frame 11D, front ends of lower frames 11A2, 11A2 on the rear side are coupled to the front cross frame 11D is shown, however, frame structure in which the lower frames 11A, 11A are not divided in two in the longitudinal direction may be also provided.

The vehicle body frame 11 also includes a pair of right and left upper frames 11E, 11E bent and extended substantially horizontally in the backward direction of the vehicle body after they are extended upward from substantially intermediate parts of the lower frames 11A, 11A, brackets 11F, 11F for vertically connecting the rears of the lower frames 11A, 11A and the rears of the upper frames 11E, 11E, a pair of right and left side lower frames 11G, 11G provided substantially in parallel with the lower frames 11A, 11A on the right side and on the left side of an intermediate part of the vehicle body and a pair of right and left side upper frames 11H, 11H provided substantially in parallel with the upper frames 11E, 11E substantially on the upsides of the side lower frames 11G. These frames are integrated via plural coupling members. A bulkhead plate 11K for partitioning the front of the body and the passenger compartment is provided between the pair of upper and lower front cross frames 11C, 11D.

The right and left occupant seats 18 are coupled to the upper frames 11E, 11E and the side upper frames 11H, 11H via brackets and the like as shown in FIG. 2. The roll bar 40 enclosing the passenger compartment is coupled to the vehicle body frame 11. The roll bar 40 is configured by coupling plural pipe members and to classify roughly, as shown in FIGS. 1 and 3, the roll bar is provided with a pair of right and left roll bar front pipes 44, 44 extended in an upward direction of the vehicle body from the upsides of the rears of the right and left front fenders 32, 32, a roll bar front upper pipe 45 coupled to upper ends of the right and left roll bar front pipes 44, 44 and laterally extended between the roll bar front pipes 44, 44, a pair of right and left roll bar upper pipes 46 bent in a downward direction of the vehicle body after they are extended in the downward direction of the vehicle body from the roll bar front upper pipe 45 and a pair of right and left roll bar rear pipes 47, 47 coupled to rear ends of the roll bar upper pipes 46, 46 and extended in the downward direction of the vehicle body. The roll bar 40 is fixed to the vehicle body frame 11 by coupling a lower part of the front of the roll bar 40, which is lower ends of the roll bar front pipes 44, 44, to brackets 11C1, 11C1 (see FIG. 2) provided to the front cross frame 11C and coupling a lower part of the rear of the roll bar 40, which is lower ends of the roll bar rear pipes 47, 47, to the side upper frames 11H, 11H.

A pair of right and left guard frames on the back side 48, 48 extended substantially in a U-shape toward the center in a direction of vehicle width on the back side of the passenger compartment are provided to the roll bar 40 and a pair of right and left hip guards 49, 49 extended substantially in a U-shape in the forward direction of the vehicle body on the sides of the body of the occupant seats 18, 18 are provided to the roll bar. Brackets 48A, 48A are provided to the guard frames on the back side 48, 48 in positions corresponding to the upsides of the occupant seats 18 and head rests 18A, 18A (see FIG. 1) are fixed to the brackets 48A, 48A. Bases of the hip guards 49, 49 are coupled to the guard frames on the back side 48, 48 and the roll bar rear pipes 47, 47 as shown in FIG. 4, fronts of the hip guards 49, 49 are extended toward the front of the vehicle body, and are coupled to brackets 11H1, 11H1 provided to the side upper frames 11H, 11H.

The side covers 41, 41 are located on the downsides of the occupant seats 18, 18 in a side view of the vehicle body and as shown in FIG. 3, in each side cover, an upper cover part 41A provided with a part 41A1 having difference in a level and concave in the downward direction of the vehicle body, a side cover part 41B extended in the downward direction of the vehicle body from the upper cover part 41A and a back cover part 41C extended in the downward direction of the vehicle body along a rear edge of the side cover part 41B from a rear end of the upper cover part 41A and also functioning as fenders for covering the fronts of the rear wheels 15, 15 are integrated. The part 41A1 having difference in a level of the upper cover part 41A is formed to avoid interference with the roll bar 40 and is formed in a shape and in strength respectively also usable as a step for the occupant to put his/her foot and to move on the side of the occupant seats 18, 18.

Clearance among the bulkhead plate 11K arranged between the front cross frames 11C, 11D, the upper frames 11E, 11E and the side upper frames 11H, 11H functions as the leg room 60 for occupants seated on the occupant seats 18, 18. The leg room 60 is extended in a lateral direction of the vehicle body, and is open on the side of the body 10A, as shown in FIG. 1, a floor panel 61 is laid at the bottom of the leg room 60, and footboards 62, 62 (see FIG. 8 described later) provided in a lower position than the floor panel 61 are provided to right and left ends of the floor panel 61.

The door 70 is provided to cover the opening 60A on the side of the leg room 60 and is openably attached to right and left door supporting frames 11X, 11X coupled by brackets 11XA, 11XB so that right and left ends of the front cross frame 11C and the front of the side lower frame 11G are connected via a pair of upper and lower door hinges 80 as shown in FIGS. 3 and 4. The door supporting frames 11X, 11X are covered with cover members 33, 33 located at the back of the front fenders 32, 32 in the side view of the vehicle body as shown in FIG. 2.

A lock unit 91 locked by a latch striker 90 provided on the side of the vehicle body frame 11, or more concretely, the hip guard 49, when the door 70 is closed is provided to the door 70 as shown in FIG. 4, a lock is released by operating an opening/closing lever 92 provided to the lock unit 91, and the door 70 can be opened.

Next, the door 70 will be described in detail. A door body 71 of the door 70 is integrated by hollow resin molding and is formed to be a door having predetermined thickness though the inside is hollow. The door 70 is provided with an external shape that it is extended in the longitudinal direction of the vehicle body between the front fender 32 and the side cover as shown in FIG. 1, its upper edge is extended substantially horizontally at the substantially same level as a surface of the occupant seat 18 and its lower edge is extended substantially horizontally in the vicinity of an upper edge of each side lower frame 11G.

An outside surface (external surface) of the door body 71 is provided with a concave upper half 71A located in front of the part having difference in a level 41A1 provided to the upper cover part 41A of the side cover 41 and a lower half 71B located in front of the side cover part 41B of the side cover 41 as shown in FIG. 3 and hereby, when the door 70 is closed, the door is formed in an external shape that the side cover 41 and the door body 71 are substantially integrated.

When the door 70 is closed, a rear edge and a lower edge of the door body 71 are overlapped with the outside of the side cover 41 and the door is formed so that no clearance in the lateral direction of the vehicle body is formed between the door body 71 and the side cover 41.

Figure 5:
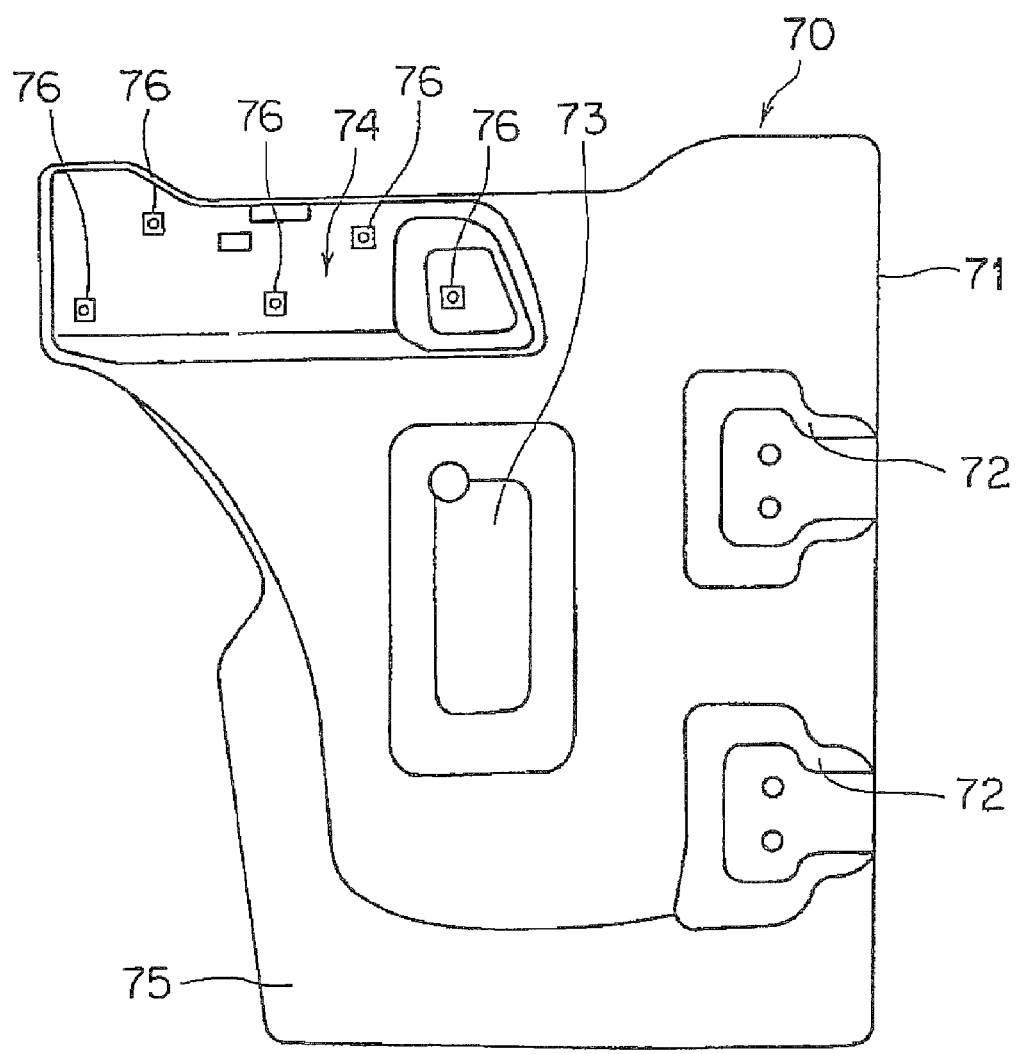
FIG. 5 shows a vehicle body of the door viewed from the inside of the vehicle body.
Figure 6:
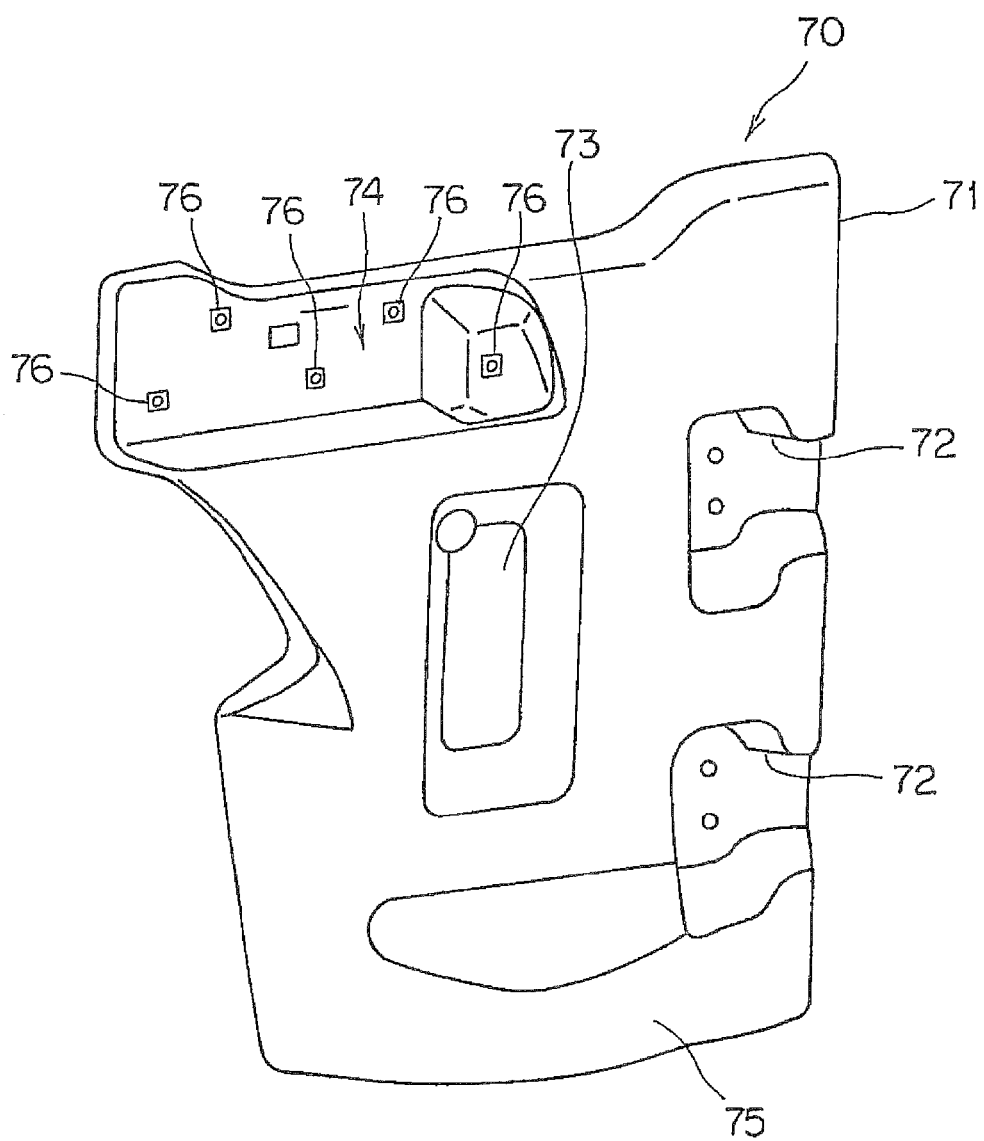
FIG. 6 is a perspective view showing the vehicle body of the door viewed from the inside of the vehicle body.

FIG. 5 shows the door body 71 viewed from the inside of the vehicle body and FIG. 6 is a perspective view showing it. As shown in FIGS. 5 and 6, a pair of upper and lower front concave portions 72, 72 in which each door hinges 80, 80 is embedded are formed in the front of an inside surface of the door body 71 and hereby, the door hinges 80, 80 are prevented from being protruded inside the vehicle body.

A central concave portion 73 in which the occupant can put his/her leg is formed at the back of the front concave portions 72, 72 and the space for the occupant to put his/her legs can be extended by the quantity of the central concave portion 73. Further, an upper concave portion 74 for housing the lock unit 91 and the opening/closing lever 92 in the thickness of the door 70 and offsetting the thickness of the opening/closing lever is formed in the rear of an upper part of the door body 71 substantially over the central concave portion 73. A reference numeral 76 in FIGS. 5 and 6 denotes a tapped hole to which a screw for mounting the lock unit 91 is fastened.

Figure 7:
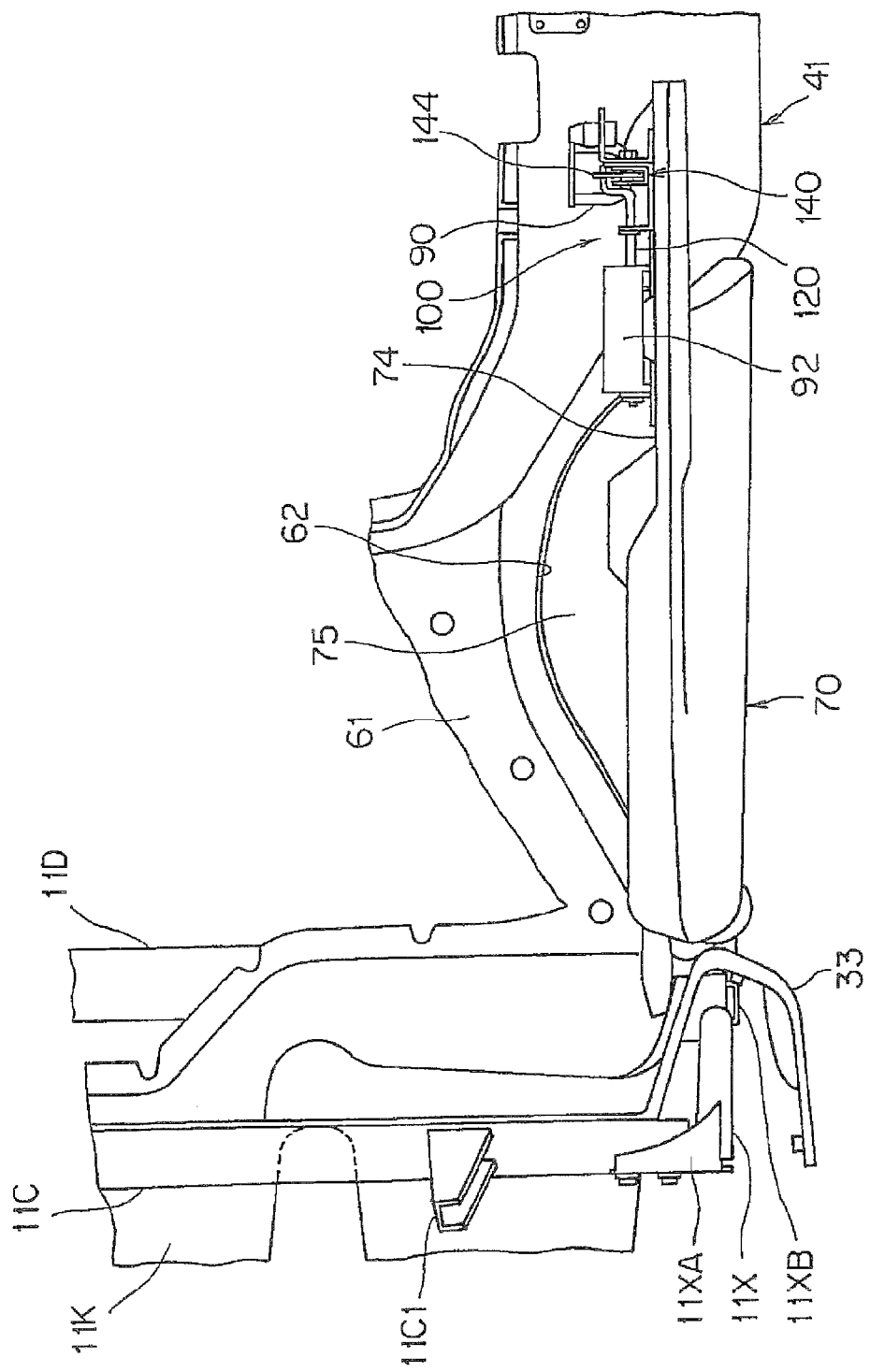
FIG. 7 shows the door viewed from the upside together with its peripheral configuration.
Figure 8:
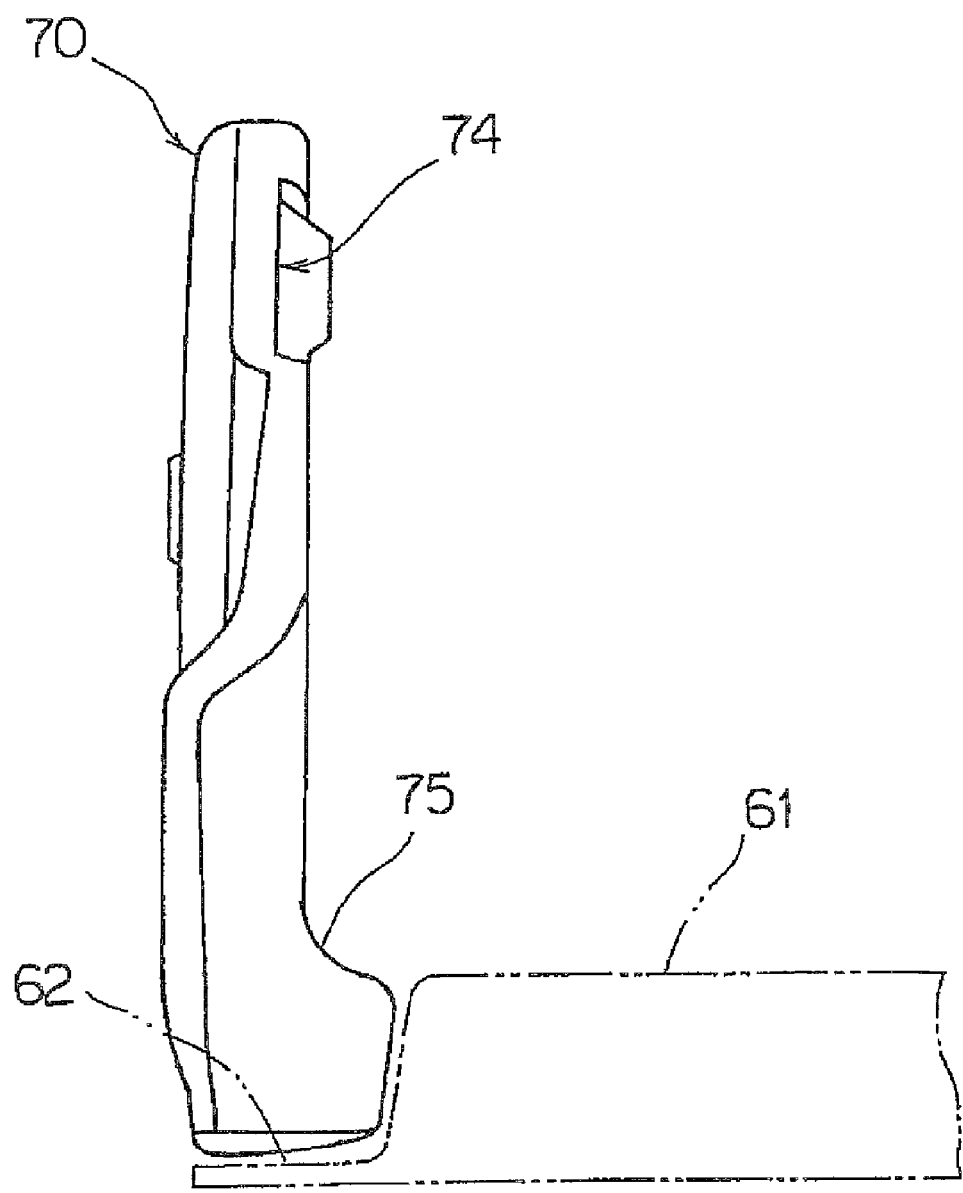
FIG. 8 shows positional relation of the door viewed from the back and a floor.

A convex portion 75 protruded inside the vehicle body from the front side to the rear side of the door body 71 is formed in a lower part of the inside of the door body 71 as shown in FIG. 6. FIG. 7 shows the door 70 viewed from the upside and FIG. 8 shows positional relation with a floor (the floor panel 61 and the footboards 62) when the door 70 is viewed from the back. As shown in FIGS. 7 and 8, the convex portion 75 gets in on the upside of the footboards 62 when the door 70 is closed and unites the floor panel 61 inside the footboards 62 and the inside surface of the door. In this case, as shown in FIG. 8, as the height of a top face of the convex portion 75 is at the same level as the floor panel 61 forming the floor, the convex portion 75 can function as a part of the floor. As the upside of the convex portion 75 is open, the space for the occupants is sufficiently secured.

Figure 9:
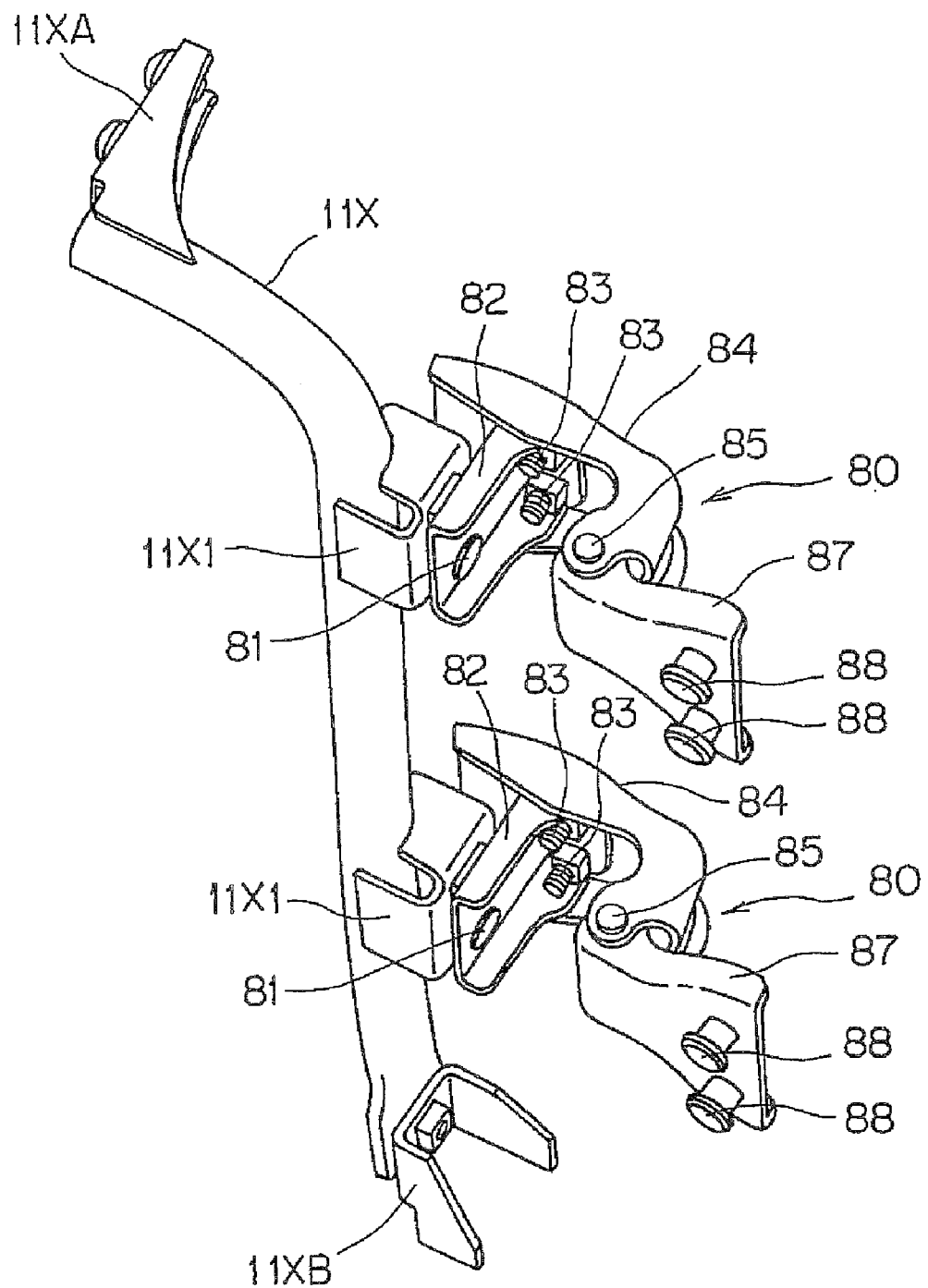
FIG. 9 shows a door hinge together with a door supporting frame.
Figure 10:
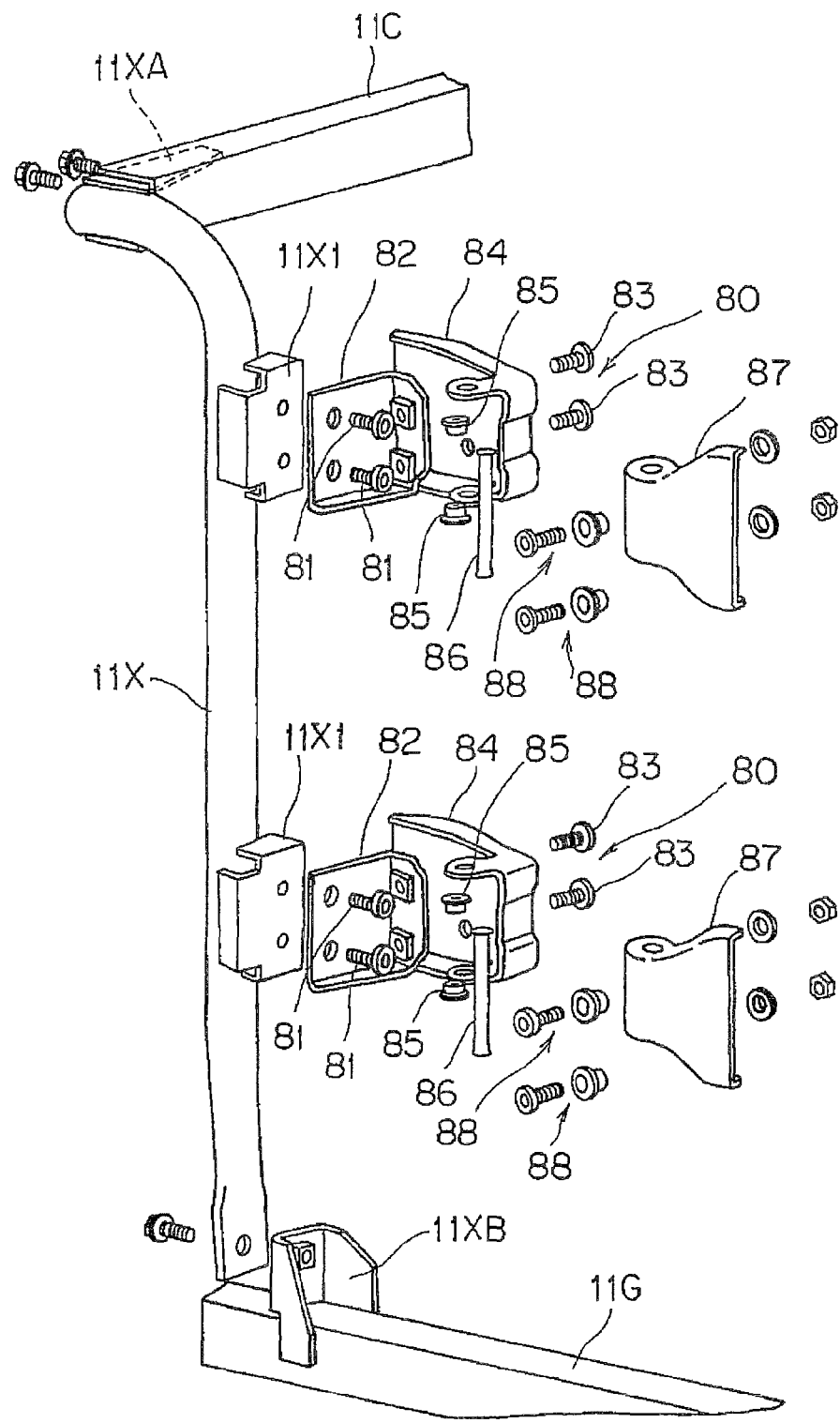
FIG. 10 is an exploded perspective view of FIG. 9.

FIG. 9 is a perspective view showing the door hinges 80, 80 together with the door supporting frame 11X and FIG. 10 is an exploded perspective view of FIG. 7. As the upper and lower door hinges 80 has the same configuration, one door hinge 80 will be described in detail. The door hinge 80 is provided with a first fixed part 82 fixed to a bracket 11X1 integrated with the door supporting frame 11X by screws 81, 81 and a second fixed part 84 fixed to the first fixed part 82 by screws 83, 83 and protruded in the backward direction of the vehicle body from the first fixed part 82. A hinge pin 86 fixed by pin fixing members 85, 85 is provided to an end of the second fixed part 84 and a moving member 87 is turnably provided via the hinge pin 86. The moving member 87 is embedded in the front concave portions 72, 72 of the door body 71 and is fixed by plural coupling parts 88 (a screw, a collar, a washer and a nut) in that state.

Figure 11:
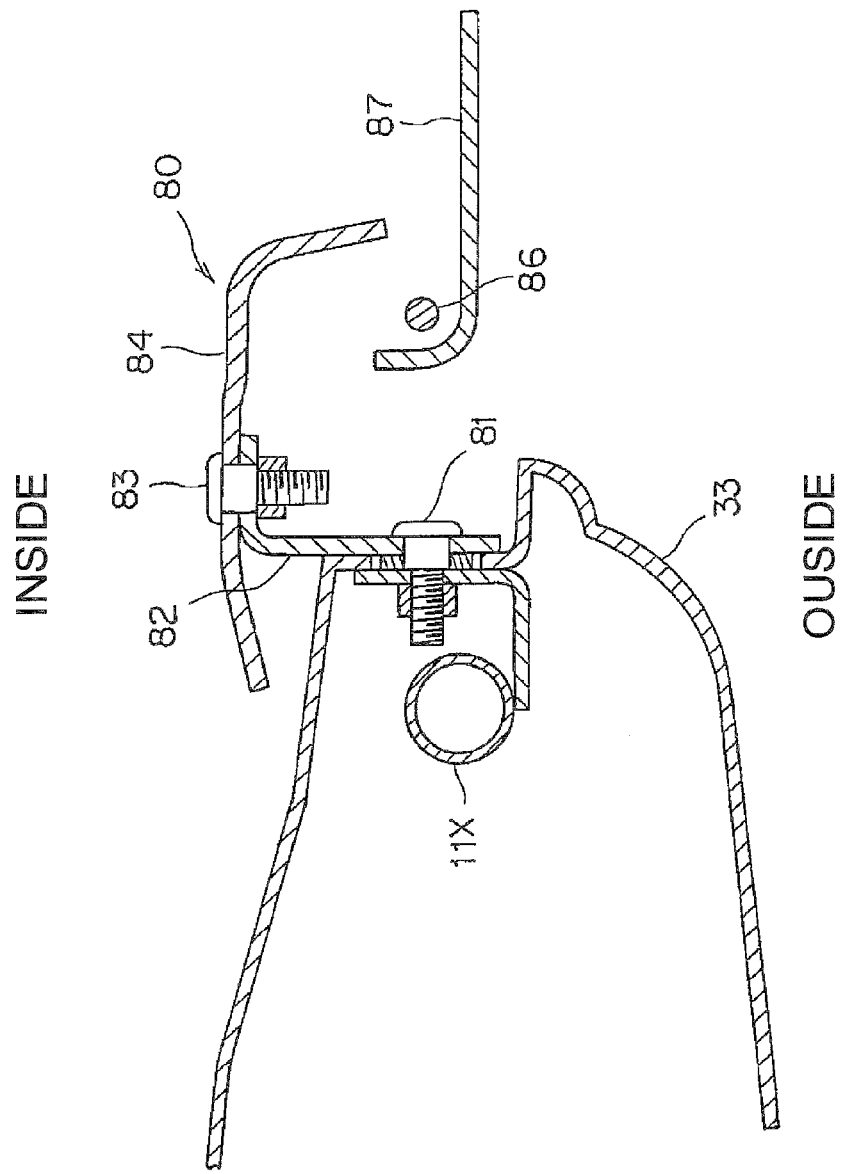
FIG. 11 shows a horizontal section of the door hinge together with its peripheral configuration.

FIG. 11 shows a horizontal section of the door hinge 80 together with its peripheral configuration. As shown in FIG. 11, as the first fixed part 82 and the second fixed part 84 respectively configuring a fixed part of the door hinge 80 connect substantially in L shape inside the vehicle body, which is on the side of the passenger compartment, of the cover member 33 covering the door supporting frame 11X and the moving member 87 is arranged outside of the end portion of the second fixed part 84, clearance between the cover member 33 and the moving member 87 of the door hinge 80 does not communicate with the inside of the vehicle body, which is the side of the passenger compartment. Therefore, a dedicated sealing member for closing the clearance between the cover member 33 and the door 70 is not required.

As the fixed part of the door hinge 80 is divided into two parts that the first fixed part 82 and the second fixed part 84, and the second fixed part 84 and the moving member 87 cover the hinge pin 86, the hinge pin 86 can be laid out so that it cannot be viewed from the outside without providing a dedicated covering member for covering the hinge pin 86.

Figure 12:
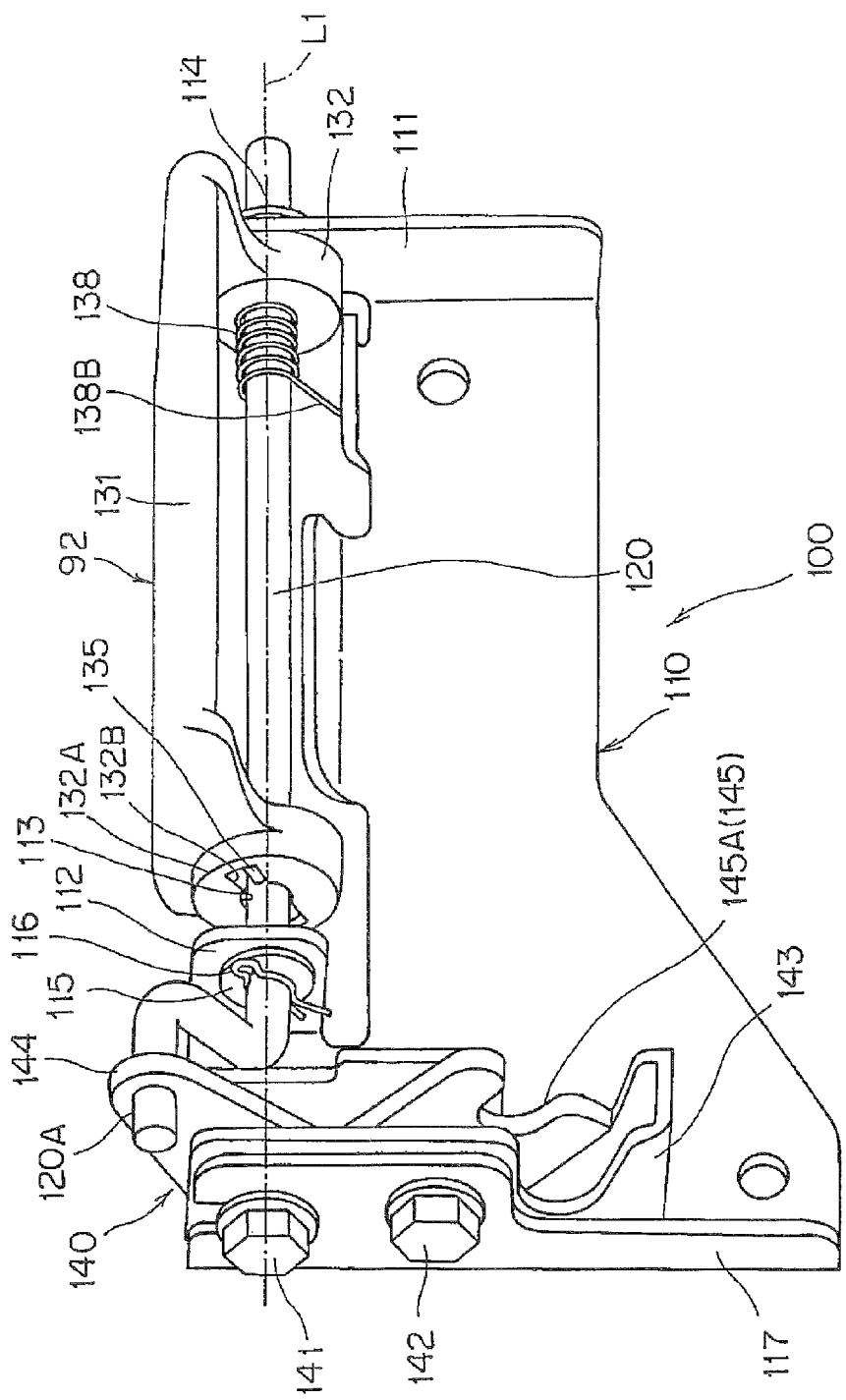
FIG. 12 shows a mechanism section of a lock unit.
Figure 13:
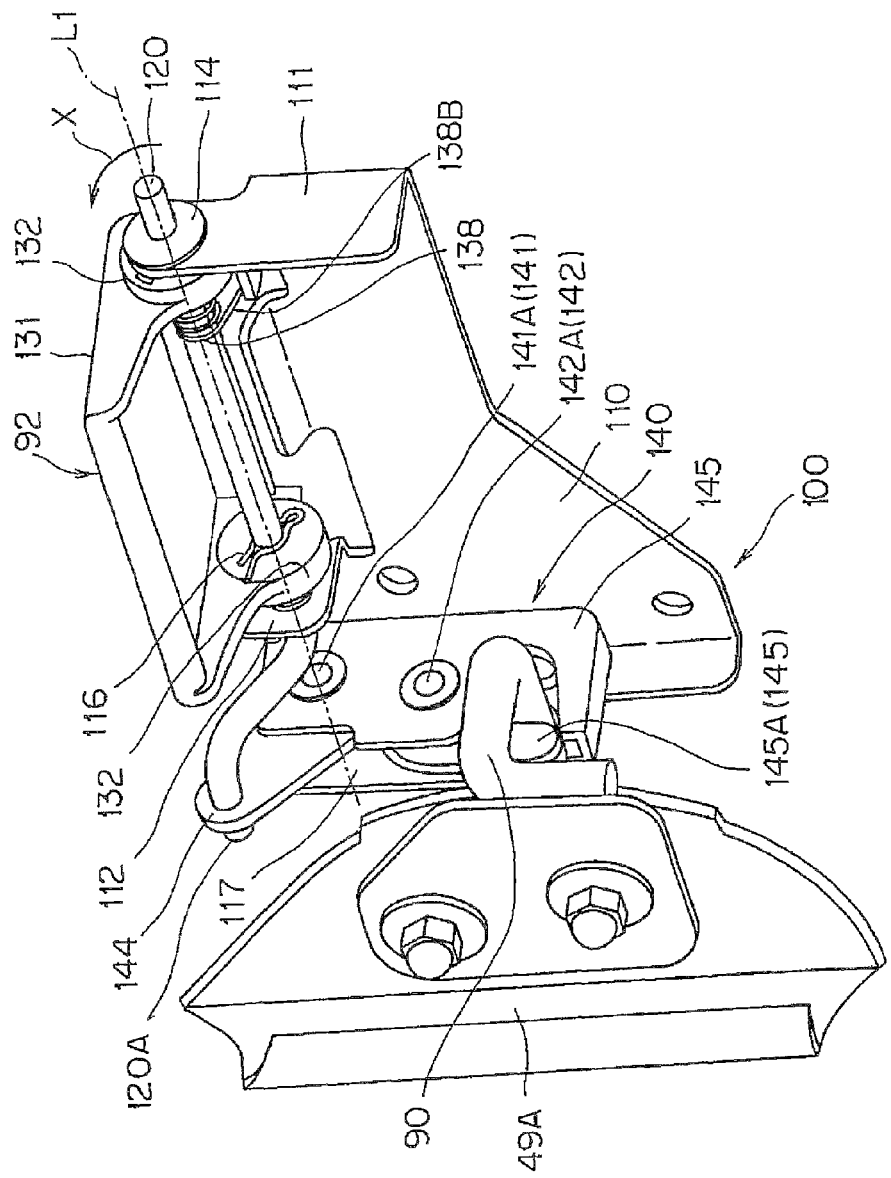
FIG. 13 shows the mechanism of the lock unit.
Figure 14:
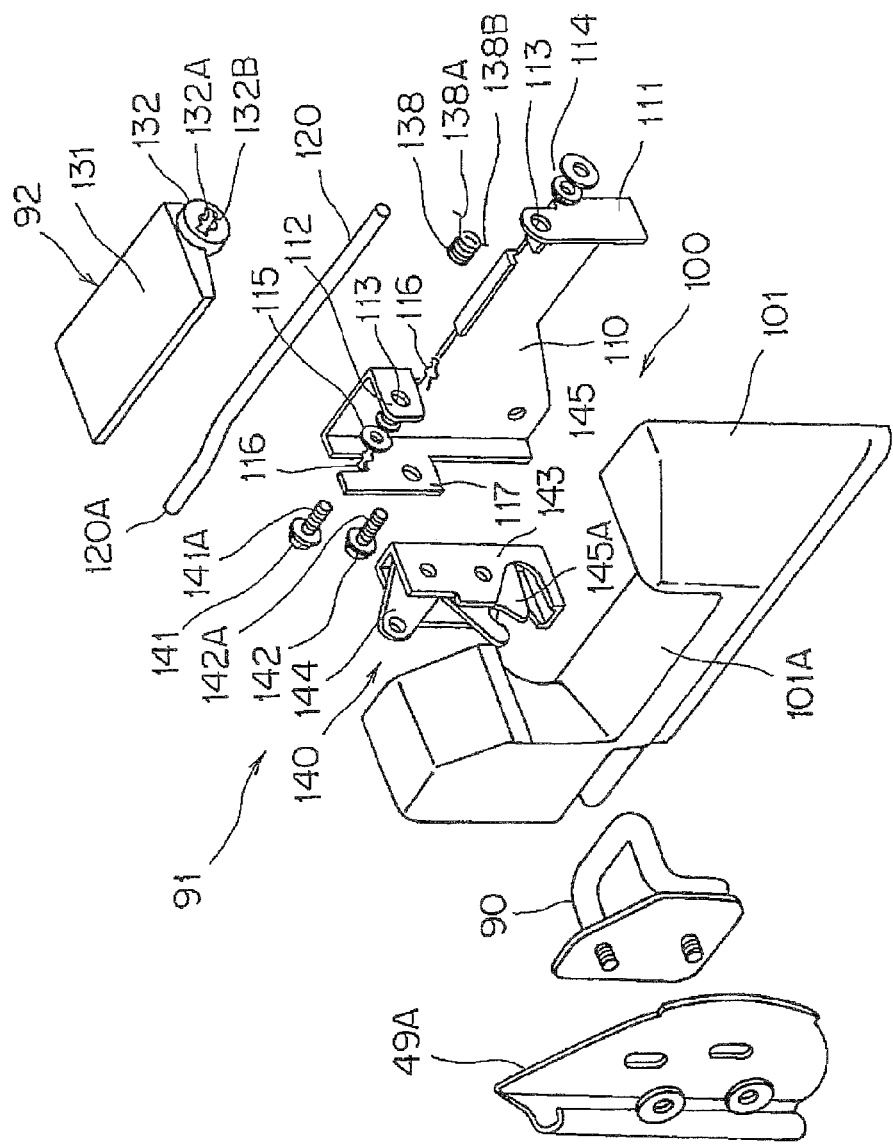
FIG. 14 is an exploded perspective view showing the lock unit.

FIGS. 12 and 13 show a mechanism section 100 of the lock unit 91 and FIG. 14 is an exploded perspective view showing the lock unit 91. The lock unit 91 is configured by the mechanism section 100 and a unit cover 101 (see FIG. 14) that covers the mechanism section 100.

The mechanism section 100 is provided with a base plate 110 closely fixed to the upper concave portion 74 (see FIG. 5) of the door 70, a supporting shaft 120 turnably supported horizontally, such as in the longitudinal direction of the vehicle body, by the base plate 110, the opening/closing lever 92 supported by the supporting shaft 120 and a latch mechanism 140, which is also called a latch lock mechanism, for locking the door which is coupled to the side of one end of the supporting shaft 120 and can be locked by the latch striker 90 provided on the side of the vehicle body frame 11.

To describe the above-mentioned in detail, a first bent part 111 bent toward the inside of the vehicle body, the passenger compartment side, is provided to the base plate 110 on the side of a front end of the vehicle body and a second bent part 112 bent toward the inside of the vehicle body is provided to the rear at an interval from the first bent part 111. A pair of front and rear through holes 113, 113 communicating horizontally are bored in the bent parts 111, 112 and the supporting shaft 120 is turnably supported horizontally by inserting the supporting shaft 120 into both through holes 113, 113.

In this case, a speed nut 114 is fastened to the supporting shaft 120 outside the first bent part 111, which is on the front side of the vehicle body, and the supporting shaft 120 is prevented from falling out by providing a washer 115 and a snap pin 116 on the side of the second bent part 112.

Figure 15:
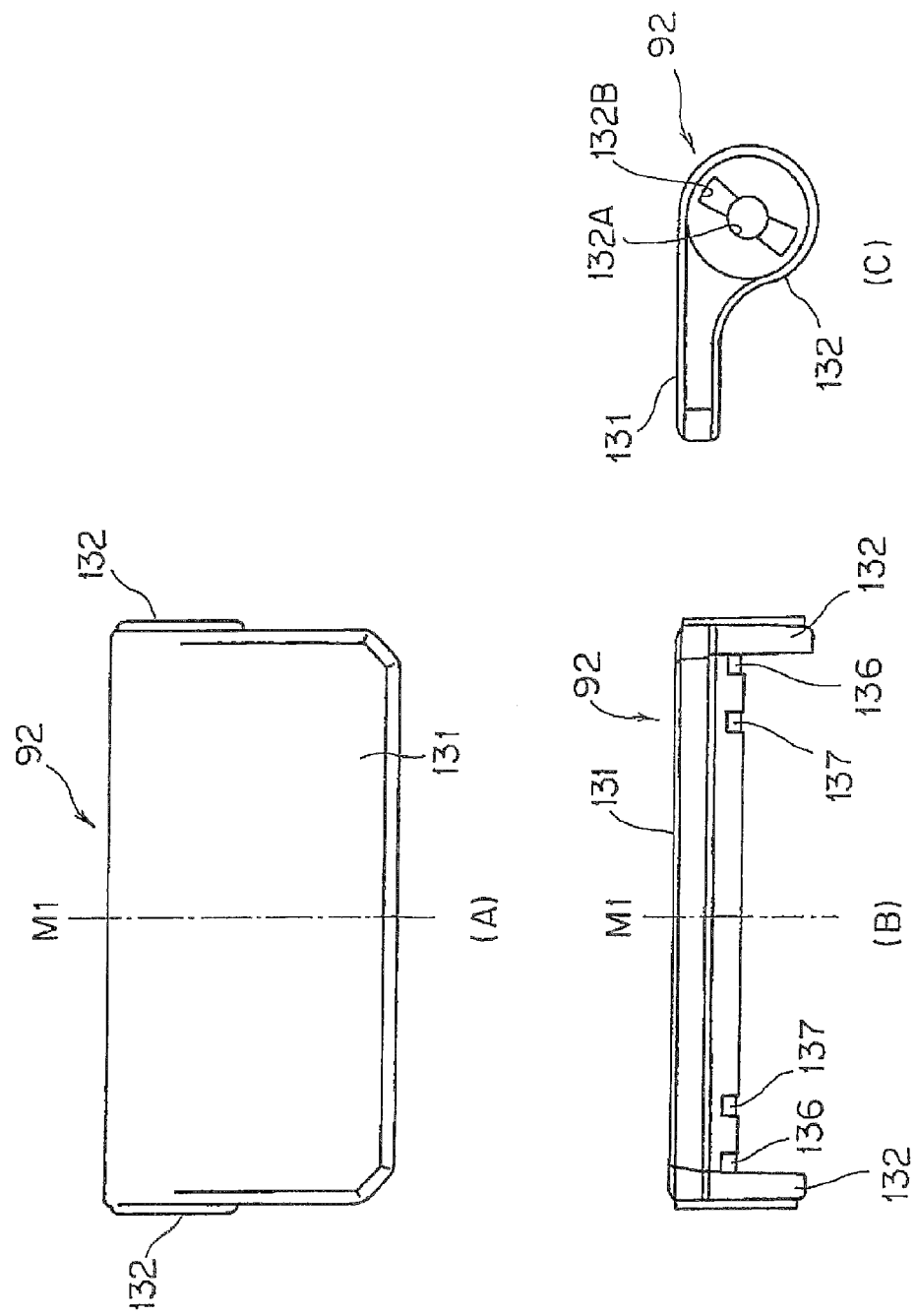
FIG. 15 shows an opening/closing lever, (A) is a top view, (B) is a plan view, and (C) is a side view.

FIGS. 15(A), (B) and (C) are a top view, a plan and a side view respectively showing the opening/closing lever 92. The opening/closing lever 92 is provided with a substantially flat grasping part 131 and a pair of shaft supporting parts 132, 132 integrated with the base side of the grasping part 131 and respectively provided at an interval. The opening/closing lever 92 is formed symmetrically based upon a central section M1 in its longitudinal direction as shown in FIGS. 15(A) and (B) and hereby, the same part can be used for the opening/closing levers 92, 92 provided to the right and left doors 70, 70.

To describe the above-mentioned in detail, as shown in FIG. 15(C), a through hole 132A into which the supporting shaft 120 is inserted is formed in each shaft supporting part 132 and a groove 132B extended in a direction of a diameter of the through hole 132A is formed. A pin 135 piercing the supporting shaft 120 in a direction of a diameter is inserted into the groove 132B as shown in FIG. 12, and the opening/closing lever 92 and the supporting shaft 120 are turnably coupled substantially integrally via the pin 135. In this case, the pin 135 is not closely inserted into the groove 132B without clearance but clearance is formed between the groove and the pin 135, and play to prevent the supporting shaft 120 from being turned even if the opening/closing lever 92 is slightly swung can be easily provided by the quantity of the clearance.

As shown in FIG. 15(B), one set of two concave portions 136, 137 for a spring are provided inside each of the pair of shaft supporting parts 132, 132 on the side of the base of the grasping part 131. One of the set of two concave portions 136, 137, which is the concave portion 136, for the spring functions as a concave portion for fitting into either one of extended parts extended from both ends of a pressing spring 138, which is extended part 138A (see FIG. 14) wound around the supporting shaft 120 as shown in FIG. 12 is fitted, and the other concave portion 137 functions as a concave portion for letting the extended part 138B extended from the other end of the pressing spring 138 and touched to the base plate 110 escape. That is, the opening/closing lever 92 is pressed onto the base plate 110 by the pressing spring 138 in a locked direction, which is in a direction shown by an arrow X in FIG. 13. In this case, the other set of concave portions 136, 137 for the spring are used for the same purpose when the opening/closing lever 92 is used for the door 70 on the opposite side.

As shown in FIGS. 12 and 13, a rear end 120A of the supporting shaft 120 is bent substantially in L shape. Therefore, the rear end 120A of the supporting shaft 120 is swung according to a vertical swing of the opening/closing lever 92 with a rotational central axis, which is an axis shown by a code L1 in FIGS. 12 and 13, of the opening/closing lever 92 in the center and is pressed downward, in the direction shown by the arrow X, by the pressing spring 138.

As shown in FIG. 12, a third bent part 117 bent inside the vehicle body, which is on the side of the passenger compartment, is provided to the base plate 110 on the rear end side of the vehicle body and the latch mechanism 140 locked by the latch striker 90 fixed to a bracket 49A (see FIGS. 12 and 13) provided to the hip guard 49 toward the outside of the vehicle body is fixed to the third bent part 117 by screws 141, 142.

For the latch mechanism 140, a rotary latch mechanism is applied, and the latch mechanism is provided with a holder 143 open inside the vehicle body and having a substantially U-shaped section, a lever member 144 turnably supported by the holder 143 via a stem 141A (see FIG. 13) of the screw 141 and a latch member 145 interlockable with the lever member 144 and turnably supported by a stem 142A (see FIG. 13) of the screw 142.

The lever member 144 is protruded inside the vehicle body from the holder 143 and the rear end 120A of the supporting shaft 120 is coupled to its end. As shown in FIG. 13, the stem 141A that turnably supports the lever member 144 is arranged on the same axis L1 as the rotational central axis of the supporting shaft 120 turned by the rock of the opening/closing lever 92. Therefore, a rotational central axis of the lever member 144 and the rotational central axis of the supporting shaft 120 coincide and the lever member 144 can be turned by the same angle according to a turn of the supporting shaft 120.

The latch member 145 is protruded inside the vehicle body from the holder 143 under the lever member 144 and a pawl 145A that can be fitted to the latch striker 90 is provided to its end. As for the latch member 145, the pawl 145A is pressed on the side fitted to the latch striker 90 by a pressing spring not shown and arranged in the holder 143 and a condition in which the pawl fitted to the latch striker 90 is held by the elastic force of the pressing spring (see FIG. 13).

The latch member 145 is coupled to the lever member 144 via a lost motion mechanism (not shown) and the lost motion mechanism operates the latch member 145 with allowance for the operation or a turn of the lever member 144.

Concretely, even if the lever member 144 is turned according to an upward swing of the opening/closing lever 92, the latch member 145 does not interlock with the lever member 144 until a rotational angle is equal to or exceeds a predetermined angle or the allowance and the fitted condition to the latch striker 90 is held. When a rotational angle of the lever member 144 is equal to or exceeds a certain angle, the latch member 145 interlocks with the lever member 144, starts its turn, and releases fitting to the latch striker 90 (see FIG. 12). Hereby, while the opening/closing lever 92 is moved with fluctuation in a range of a relatively small angle, it is latched together with the latch striker 90, and the door 70 is held not to open.

In this configuration, as shown in FIGS. 12 and 13, when no operation is applied to the opening/closing lever 92, such that the opening/closing lever 92 is at a default position, the opening/closing lever 92 is located in a position in which the grasping part 131 of the opening/closing lever 92 is substantially horizontal. Therefore, as shown in FIG. 4, the grasping part 131 of the opening/closing lever 92 is substantially horizontally exposed on a top face of the door 70 and the locking of the door 70 can be released by simple operation that the occupant grasps the grasping part 131 of the opening/closing lever 92 and lifts it upward.

As the base plate 110 of the mechanism section 100 that supports the opening/closing lever 92 is closely fixed to the upper concave portion 74 of the door body 71 as shown in FIG. 7, the opening/closing lever 92, the supporting shaft 120 and the latch mechanism 140 respectively supported by the base plate 110 are held in the thickness of the door body 71. In this case, the most of the unit cover 101 attached to the base plate 110 from the inside of the vehicle body is also held in the thickness of the door body 71 as shown in FIG. 4 and the protruded amount from the door body 71 inside the body is reduced.

The unit cover 101 is formed to substantially cover the whole mechanism section 100 except the opening/closing lever 92. That is, the unit cover 101 exposes the opening/closing lever 92 on the top face of the door not on the external surface of the door 70 but inside the vehicle body because a concave portion 101A concave in the downward direction of the vehicle body is formed in a position corresponding to the opening/closing lever 92. In this case, the opening/closing lever 92 is extended along the uppermost face in a slightly lower position than the uppermost face except the concave portion 101A of the unit cover 101 and overhang on the upside of the unit cover 101 and inside the vehicle body is avoided. As described above, as the opening/closing lever 92 is located not on the external surface of the door 70 but inside the vehicle body, the overhang outside the door of the opening/closing lever 92 can be avoided. As the opening/closing lever 92 is exposed on the top face of the door 70, the occupant can easily operate the opening/closing lever 92 from the upside of the door and can easily access it from both the outside and the inside of the door 70. A bottom of the concave portion 101A of the unit cover 101 is formed to be a slope inclined diagonally downward toward the inside of the vehicle body (see FIG. 4) and hereby, an occupant's hand can be guided to the opening/closing lever 92 along the slope.

As described above, in this configuration, as the opening/closing lever 92 is provided not on the external surface of the door 70 but inside the vehicle body so that the opening/closing lever 92 can be accessed from the outside and the inside of the door 70, the opening/closing lever 92 can be easily operated from the outside and the inside of the door 70, avoiding the overhang outside the door of the opening/closing lever 92 and can be arranged in a position substantially independent of disturbance in running. And as it can be accessed from the inside and the outside, the structure is simplified and the cost can be reduced.

In addition, as the opening/closing lever 92 is vertically swingably provided and is exposed on the top face of the door, it can be swung upward with fingers by simple operation that the occupant nips the door 70 from the upside and a door lock can be released by simple and intuitive operation.

More concretely, when the occupant seated on the occupant seat 18 opens the door 70, he/she can release the door lock by simple operation that he/she raises the opening/closing lever 92 with fingers from the upside of the door by nipping the door 70 and can promptly and easily open the door 70 with the fingers that nips the door 70. As the top face of the door 70 of the small-sized vehicle 10 is provided substantially at the same level as the surface of the occupant seat 18, the occupant seated on the occupant seat 18 and the occupant standing outside the vehicle body can easily view the opening/closing lever 92. Hereby, the operability and the visibility of the door suitable for the small-sized vehicle can be secured.

Besides, in this configuration, as the opening/closing lever 92 is offset to be housed in the thickness of the door 70, the opening/closing lever 92 can be compactly arranged without being protruded in a direction of the thickness of the door 70 as shown in FIG. 4. In addition, as shown in FIG. 4, as the opening/closing lever 92 is arranged in a slightly lower position than the top face of the door 70, the opening/closing lever 92 is not protruded on the upside of the door and can be compactly arranged. The wrong operation of the opening/closing lever 92 can be also prevented by laying out the opening/closing lever 92 so that it is not protruded outside the door as described above.

Further, in this configuration, as the rotational central axis of the supporting shaft 120 of the opening/closing lever 92 turned by the swing of the opening/closing lever 92 and the rotational central axis of the latch, which is the lever member 144, for the door lock driven by the turn of the supporting shaft 120 are laid out on the same axis L1 (see FIGS. 12 and 13), resistance when the supporting shaft 120 is turned and the latch the lever member 144 for the door lock is operated can be reduced. Therefore, the opening/closing lever 92 and the latch for the door lock can be easily interlocked. In this case, as an intricate power transmission mechanism is not required to be provided between the opening/closing lever 92 and the latch for the door lock, the mechanism section 100 can be simplified, the opening/closing lever 92 and the mechanism, the latch mechanism 140, for the door lock can be closely arranged, and the lock unit 91 can be compacted.

In addition, in this configuration, as the latch mechanism 140 and the opening/closing lever 92 are collectively arranged on the rear side of the door substantially at the same level as the surface of the occupant seat 18, the visibility and the operability of the opening/closing lever 92 can be enhanced, arranging these parts compactly.

Besides, in this configuration, as the convex portion 75 that gets in on the footboards 62 when the door 70 is closed is provided inside the door 70, an internal surface where the inside of the door 70 and the floor panel 61 provided to the bottom of the leg room 60 integrally continue is formed and space for the occupants can be secured, preventing an occupant's foot from being moved to the footboards 62. As the top face of the convex portion 75 is located at the same level as the floor panel 61, the floor can be extended by the volume of the convex portion 75. As the convex portion 75 is integrated when the door 70 is hollowly molded in resin, the convex portion 75 can be easily provided.

Further, as the central concave portion 73 for the occupant's leg to enter is provided inside the door 70, the space for occupants can be extended without changing a shape of a wall of the door 70. In this case, when the occupant's leg moves, the central concave portion 73 functions as a guide of the leg and it can be also regulated to move to the side of the opening/closing lever 92.

Further, as the front concave portions 72, 72 for embedding the door hinges 80, 80 are provided inside the door 70, the overhang on the side of the space for the occupants of the door hinges 80, 80 can be inhibited and the occupant's foot can be prevented from being touched to the door hinge 80, 80. Hereby, the space for the occupants can be also greatly secured.

Figure 16:
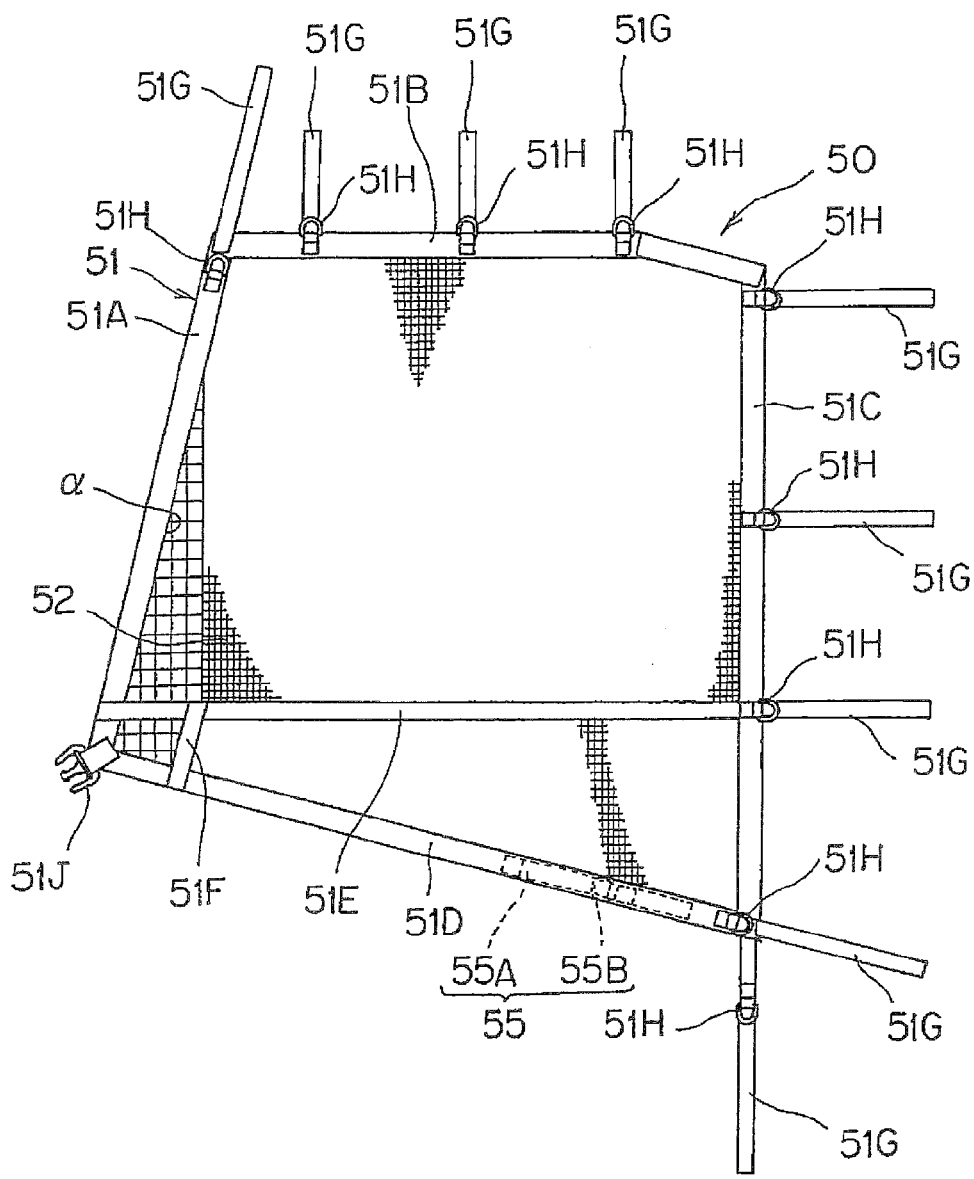
FIG. 16 shows a net.

FIG. 16 shows a net 50 that can be detachably attached to the small-sized vehicle 10 in this embodiment. As for the net 50, each is attached to the right side or the left side of each roll bar 40 and as each net has the same structure, one net 50 will be representatively described below.

The net 50 is provided with a band part 51 configured by a flexible band member extended substantially along the roll bar 40 and a mesh net part 52 spread overall inside the band part 51. The band part 51 is provided with a first band part 51A extended substantially along the roll bar front pipe 44, a second band part 51B extended substantially along the roll bar upper pipe 46, a third band part 51C extended substantially along the roll bar rear pipe 47 and a fourth band part 51D that connects the third band part 51C and the first band part 51A and these are coupled to be a band frame.

Further, a fifth band part 51E extended substantially horizontally between the first band part 51A and the third band part 51C is provided to the band frame and a sixth band part 51F extended substantially in parallel with the first band part 51A between the front of the fifth band part 51E and the front of the fourth band part 51D is provided.

A fixing band part 51G is provided to the first band part 51A to the fourth band part 51D in each position corresponding to a looped band fastening part 40A (see FIG. 4) provided at an interval on the roll bar 40, and a fixture 51H in the shape of a substantially D-shaped loop is provided on the base side of the fixing band part 51G. Further, a coupled tool 51J that can be detachably attached to a coupling tool 40B (see FIG. 3)

provided to the lower end of the front of the roll bar 40 is provided to a part in which the first band part 51A and the fourth band part 51D are coupled. The band fastening part 40A provided to the roll bar 40 is protruded in an internal direction of the vehicle body and is laid out not to overhang outside the roll bar 40. Hereby, even when an obstacle exists in a circumference in running, the obstacle is also prevented from touching to the band fastening part 40A.

The net part 52 is attached to each band part to cover an area enclosed by the first band part 51A to the fourth band part 51D and the whole net part 52 is formed in a mesh of pitch in which the occupant seated on the occupant seat 18 can sufficiently view the outside. Pitch in the mesh of the net part 52 is varied depending upon a location and pitch in a mesh of an area, where a substantially triangular area shown in FIG. 16, on the rear side of the first band part 51A is set to be larger than pitch in a mesh of the other area.

When the net 50 is attached to the roll bar 40, first, the coupled tool 51J provided to the net 50 is installed in the coupling tool 40B of the roll bar 40 and next, the net 50 is fastened to the roll bar 40 by using each fixture 51H provided to the net 50 after plural fixing band parts 51G provided to the net 50 are let through each band fastening part 40A provided to the roll bar 40. A hip guard fitting 55 for fixing the net 50 to the hip guard 49 is provided to the net 50. The hip guard fitting 55 is configured by a fixing band part 55A like a strap one end of which is attached or sewed to/on the fourth band part 51D of the band part 51 and a substantially D-shaped looped fixture 55B attached or sewed to/on the fourth band part 51D so that the side of the other end of the fixing band part 55A can be fastened. Positions in which the fixing band parts 51G, 55A are attached to the fixtures 51H, 55B can be adjusted by the substantially D-shaped looped fixtures 51H, 55B.

Figure 17:
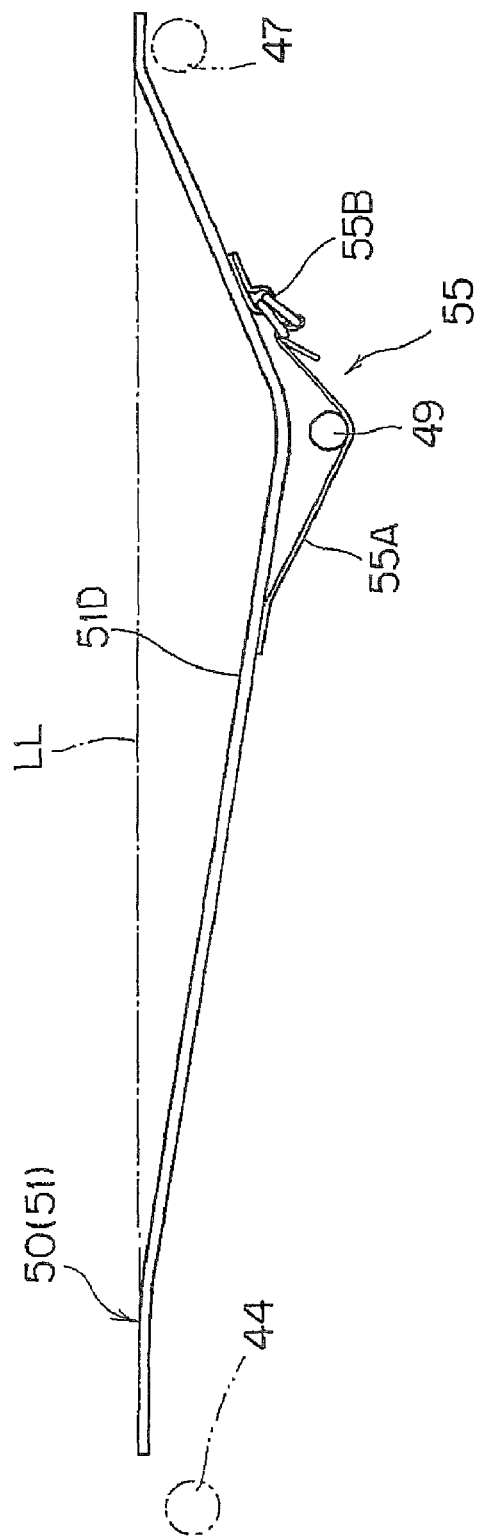
FIG. 17 shows the net together with a hip guard respectively viewed from the downside.

FIG. 17 shows the fixing band part 55A together with hip guard 49 respectively viewed from the downside.

As shown in this figure, the fixing band part 55A is attached to the fixture 55B through the inside of the hip guard 49 and at this time, the fourth band part 51D of the band part 51 is pulled near the hip guard 49 and this condition is held. A straight line LL shown by an alternate long and short dash line in FIG. 17 shows a position before the fourth band part 51D of the band part 51 is pulled near the hip guard 49 and is also equivalent to positions of the fifth band part 51E laid between the first band part 51A and the third band part 51C and the second band part 51B in a state in which the net 50 is attached to the roll bar 40 of the vehicle.

In this case, as the hip guard 49 is located inside the vehicle body, compared with the right and left roll bar front pipes 44, 44 and the roll bar rear pipes 47, 47 (see FIG. 3 and the like), the fourth band part 51D of the band part 51 is also arranged inside the vehicle body, where on the side of the occupant, compared with the roll bar front pipes 44, 44 and the roll bar rear pipes 47, 47.

When the net 50 is mounted on the roll bar 40 as described above, the fifth band part 51E extended substantially horizontally between the first band part 51A and the third band part 51C is located on the side of the steering wheel 20 (see FIG. 1) and it can be regulated for an occupant's hand gripping the steering wheel 20 and the like to overhang outside the vehicle body.

Besides, as the fourth band part 51D extended between the first band part 51A and the third band part 51C under the fifth band part 51E is attached to the hip guard 49, the fourth band part 51D can be arranged closely on the side of the occupant seated on the occupant seat 18 inside the hip guard 49 and the occupant can be securely protected. In this case, as the net 50 can be turned up using the hip guard 49 for a guide when the net 50 is lifted in riding, the net 50 does not interfere riding. As the area a set so that the pitch in a mesh of the net part 52 is large is located in the front right or the front left area of the occupant seated on the occupant seat 18, visibility in a front lateral direction of the vehicle body by the occupant can be enhanced.

Figure 18:
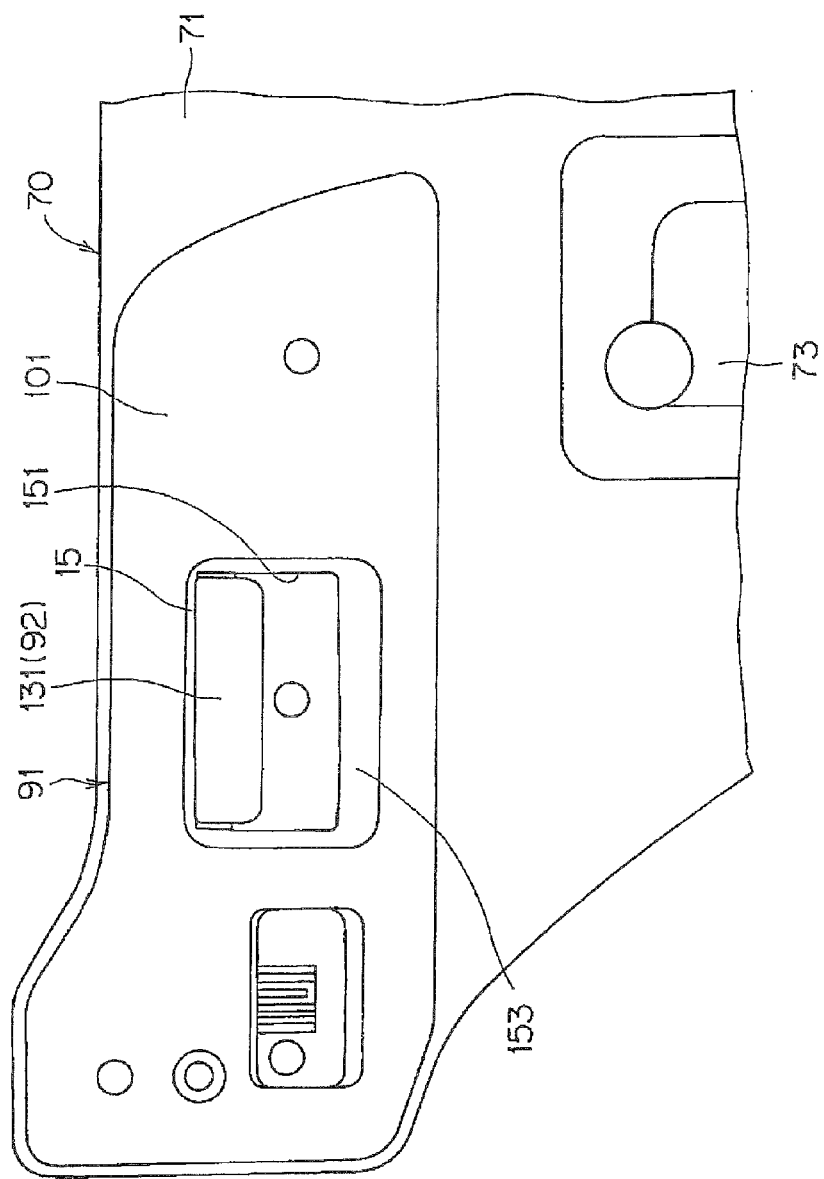
FIG. 18 shows a lock unit of a door in a second embodiment together with its peripheral configuration.

FIGS. 18 and 19 show an another configuration of lock unit 91. In the door 70, an opening/closing lever 92 is provided to the vicinity of an upper end of the door 70. Detailedly, as shown in FIG. 18, a concave portion 151 which is not open upward though it is made concave toward the outside of the vehicle body to expose the opening/closing lever 92 inside the vehicle body is provided to a unit cover 101 covering a mechanism section 100 of a lock unit 91 from the inside of a vehicle body and the opening/closing lever 92 is exposed only inside the vehicle body without being exposed from a top face of the door owing to an upper wall 152 of the concave portion 151. In this case, the opening/closing lever 92 is arranged in the vicinity of a top face (the vicinity of an upper end) of the unit cover 101, and is extended along a surface inside the vehicle body of the unit cover 101, and overhang from the upside of the unit cover 101 and from the inside of the vehicle body is avoided. A lower wall 153 of the concave portion 151 is formed in a low position at an interval between the lower wall and the opening/closing lever 92 and space for an occupant to insert his/her fingers is formed under the opening/closing lever 92.

As shown in FIG. 19, in the lock unit 91, a position (a default position of the opening/closing lever 92) of the opening/closing lever 92 when no control force is applied to the opening/closing lever 92 is set so that an end of a grasping part 131 of the opening/closing lever 92 is directed substantially downward. Therefore, a door lock can be released by swinging the opening/closing lever 92 so that the end of the grasping part 131 is raised inside the vehicle body.

As described above, even if the opening/closing lever 92 is arranged in the vicinity of the top face (the vicinity of the upper end) of the door 70, the opening/closing lever 92 can be located not on an external surface of the door 70 but inside the vehicle body to enable access from the outside and the inside of the door 70 as in the first embodiment, the opening/closing lever 92 can be swung upward by an occupant's thumb and the like by substantially the same operation as the occupant grasps an upper edge of the door 70, and the door lock can be released by simple and intuitive operation.

In addition, as the opening/closing lever 92 is exposed in the concave portion 151 provided to the unit cover 101 and made concave toward the outside of the vehicle body, the opening/closing lever 92 and the like are housed in the thickness of the door 70, the thickness of the opening/closing lever can be offset, and the wrong operation of the opening/closing lever 92 from the upside can be prevented. The concave portion 151 provided to the unit cover 101 can guide the occupant's fingers to the opening/closing lever 92.

The present invention has been described based upon the embodiments, however, the present invention is not limited to these and various alterations of design are possible. For example, in the above-mentioned embodiment, the case that the present invention is applied to the door device of the small-sized vehicle provided with the doors on both sides of the vehicle body has been described, however, the present invention may be also applied to a door device of a small-sized vehicle provided with a vehicle body at least one side of which is open.

In addition, in the above-mentioned embodiment, the case that the present invention is applied to the door device of the small-sized vehicle classified into an MUV has been described, however, the present invention may be also applied to a door device of a small-sized vehicle other than the MUV.

The invention claimed is:

1. A vehicle comprising:
   a body having an opening on a side;
   a footboard at a lower end of the opening; and
   an openable door attached to the side of the body and hinged to cover the opening,
   wherein the door includes an inner body surface having a protruding portion that is provided at an inside lower part of the door, the protruding portion protruding from the inner body surface of the door towards a floor of the vehicle above the footboard when the door is in a closed position, and
   wherein the door includes a first recessed portion provided at a location above the protruding portion and in a position corresponding to an occupant seat of the vehicle for letting in an occupant's leg, the first recessed portion extending into a body of the door from the inner body surface, the first recessed portion being separated from the protruding portion.

2. The vehicle according to claim 1,
   wherein the door includes a second recessed portion provided to a front end of the door for embedding a door hinge of the door.

3. The vehicle according to claim 1,
   wherein the footboard is provided to an end of a floor of the vehicle in a lower part than the floor; and
   height of a top face of the protruding portion is set to the same level as the floor.

4. The vehicle according to claim 1,
   wherein the door is hollowly molded in resin; and
   the protruding portion is integrated when the door is hollowly molded in resin.

5. The vehicle according to claim 1,
   wherein the door is provided with a latch mechanism fitted to a latch striker provided on the side of the vehicle body; and
   the latch mechanism is provided with a lever member operated according to operation of an opening/closing lever and a latch member that can release fitting to the latch striker in interlock with operation of the lever member.

6. The vehicle according to claim 5,
   wherein the latch member is coupled to the lever member via a lost motion mechanism that operates the latch member with play for the operation of the lever member.

7. The vehicle according to claim 1,
   wherein the door includes a third recessed portion that is provided at a top portion of the door and that extends into the body from the inner surface, a latch mechanism being provided to the third recessed portion, the latch mechanism being configured to be fitted to a latch striker provided on the side of the body.

8. The vehicle according to claim 7,
   wherein the door includes a lever provided in a location above the third recessed portion for opening the door.

* * * * *